United States Patent
Chen et al.

(10) Patent No.: US 7,606,304 B2
(45) Date of Patent: Oct. 20, 2009

(54) METHOD AND APPARATUS FOR MEMORY EFFICIENT COMPRESSED DOMAIN VIDEO PROCESSING

(75) Inventors: William Chen, Foster City, CA (US); Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 287 days.

(21) Appl. No.: 11/624,598

(22) Filed: Jan. 18, 2007

(65) Prior Publication Data

US 2007/0121729 A1    May 31, 2007

Related U.S. Application Data

(62) Division of application No. 10/319,775, filed on Dec. 13, 2002, now Pat. No. 7,190,724.

(60) Provisional application No. 60/372,207, filed on Apr. 12, 2002.

(51) Int. Cl.
*H04B 1/66* (2006.01)
*H04N 11/02* (2006.01)
*H04N 11/04* (2006.01)

(52) U.S. Cl. .................................. 375/240.02

(58) Field of Classification Search ............ 375/240.03, 375/240.14, 240.13, 240.15, 240.25, 240.24; 382/232, 234, 236; *H04B 1/66; H04N 11/02, H04N 11/04*
See application file for complete search history.

(56) References Cited

U.S. PATENT DOCUMENTS

| 5,784,494 | A | 7/1998 | Strongin et al. |
|---|---|---|---|
| 5,821,887 | A | 10/1998 | Zhu |
| 5,838,825 | A * | 11/1998 | Obayashi et al. ............ 382/233 |
| 5,867,598 | A | 2/1999 | de Queiroz |
| 6,002,801 | A | 12/1999 | Strongin et al. |
| 6,009,203 | A | 12/1999 | Liu et al. |
| 6,009,205 | A | 12/1999 | Yoshida |
| 6,112,219 | A | 8/2000 | Girod et al. |
| 6,134,571 | A | 10/2000 | Kresch et al. |
| 6,157,740 | A | 12/2000 | Buerkle et al. |
| 6,167,092 | A | 12/2000 | Lengwehasatit |
| 6,223,181 | B1 | 4/2001 | Goldberg et al. |
| 6,240,210 | B1 | 5/2001 | Koyama |
| 6,298,166 | B1 | 10/2001 | Ratnakar et al. |
| 6,304,604 | B1 | 10/2001 | Adiletta et al. |
| 6,327,602 | B1 | 12/2001 | Kim |
| 6,414,608 | B1 | 7/2002 | Nishida et al. |
| 6,501,863 | B1 | 12/2002 | Fukuhara et al. |
| 6,525,783 | B1 * | 2/2003 | Kim et al. ................... 348/714 |
| 6,728,313 | B1 * | 4/2004 | Tu et al. ................. 375/240.03 |
| 6,823,016 | B1 * | 11/2004 | Nguyen et al. ......... 375/240.25 |
| 6,961,383 | B1 | 11/2005 | Reibman et al. |
| 6,987,811 | B2 * | 1/2006 | Tanaka et al. .......... 375/240.25 |
| 2002/0027954 | A1 * | 3/2002 | Singh et al. ............ 375/240.03 |

* cited by examiner

*Primary Examiner*—Tung Vo

(57) ABSTRACT

A method for reducing the memory requirements for decoding a bit stream is provided. The method initiates with receiving a video bit stream. Then, a frame of the bit stream is decoded into a discrete cosine transform (DCT) domain representation. Next, non-zero coefficients of the DCT domain representation are identified. Then, a hybrid data structure is assembled. The hybrid data structure includes a fixed size array and a variable size overflow vector. Next, the non-zero coefficients of the DCT domain representation are inserted into the hybrid data structure. A computer readable media, a printed circuit board and a device configured to decode video data are also provided.

23 Claims, 15 Drawing Sheets

US 7,606,304 B2

METHOD AND APPARATUS FOR MEMORY EFFICIENT COMPRESSED DOMAIN VIDEO PROCESSING

CROSS REFERENCE TO RELATED APPLICATIONS

This application is a divisional of, and claims priority under 35 U.S.C. § 120 from U.S. patent application Ser. No. 10/319,775 filed on Dec. 13, 2002, and entitled "Method and Apparatus for Memory Efficient Compressed Domain Video Processing" which claims priority from U.S. Provisional Patent Application No. 60/372,207, filed on Apr. 12, 2002, and entitled "Data Structures and Algorithms for Memory Efficient, Compressed Domain Video Processing." This application is related to U.S. patent application Ser. No. 10/319,747 filed on Dec. 13, 2002, and entitled "Method and Apparatus for Fast Inverse Motion Compensation Using Factorization and Integer Approximation" which, are hereby incorporated by reference in their entirety.

BACKGROUND OF THE INVENTION

1. Field of the Invention

This invention relates generally to digital video technology and more particularly to a method and apparatus for implementing efficient memory compression methods.

2. Description of the Related Art

The access of video on mobile terminals, such as cellular phones and personal digital assistants, presents many challenges because of the limitations due to the nature of the mobile systems. For example, low-powered, handheld devices are constrained under bandwidth, power, memory, and cost requirements. The video data received by these handheld devices are decoded through a video decoder. The video decoders associated with such terminals perform motion compensation in the spatial domain, i.e., decompressed domain. Video compression standards, such as H.263, H261 and MPEG-1/2/4, use a motion-compensated discrete cosine transform (DCT) scheme to encode videos at low bit rates. As used herein, low bit rates refer to bit rates less than about 64 kilobits per second. The DCT scheme uses motion estimation (ME) and motion compensation (MC) to remove temporal redundancy and DCT to remove the remaining spatial redundancy.

FIG. 1 is a schematic diagram of a video decoder for decoding video data and performing motion compensation in the spatial domain. Bit stream 102 is received by decoder 100. Decoder 100 includes variable length decoder (VLD) stage 104, run length decoder (RLD) stage 106, dequantization (DQ) stage 108, inverse discrete cosine transform (IDCT) stage 110, motion compensation (MC) stage 112 and memory (MEM) 114, also referred to as a frame buffer. The first four stages (VLD 104, RLD 106, DQ 108, and IDCT 110) decode the compressed bit stream back into the pixel domain. For an intracoded block, the output of the first four stages, 104, 106, 108 and 110, is used directly to reconstruct the block in the current frame. For an interceded block, the output represents the prediction error and is added to the prediction formed from the previous frame to reconstruct the block in the current frame. Accordingly, the current frame is reconstructed on a block by block basis. Finally, the current frame is sent to the output of the decoder, i.e., display 116, and is also stored in frame buffer (MEM) 114.

MEM 114 stores the previously decoded picture required by motion compensation 112. The size of MEM 114 must scale with the incoming picture format. For example, H.263 supports five standardized picture formats: (1) sub-quarter common intermediate format, (sub QCIF), (2) quarter common intermediate format (QCIF), (3) common intermediate format (CIF), (4) 4CIF, and (5) 16CIF. Each format defines the width and height of the picture as well as its aspect ratio. As is generally known, pictures are coded as a single luminance component and two color difference components (Y, Cr, Cb). The components are sampled in a 4:2:0 configuration, and each component has a resolution of 8 bits/pixel. For example, the video decoder of FIG. 1 must allocate approximately 200 kilobytes of memory for MEM 114 while decoding a H.263 bit stream with CIF format. Furthermore, when multiple bit streams are being decoded at once, as required by video conferencing systems, the demands for memory become excessive.

MEM 114 is the single greatest source of memory usage in video decoder 100. In order to reduce memory usage, one approach might be to reduce the resolution of the color components for the incoming bit stream. For example, if the color display depth on the mobile terminal can only show 65,536 colors, then it is possible to reduce the resolution of the color components (Y, Cr, Cb) from 24 bits/pixel down to 16 bits/pixel. While this technique can potentially reduce memory usage by 30%, it is a display dependent solution that must be hardwired in the video decoder. Also, this technique does not scale easily with changing peak signal-to-noise ratio (PSNR) requirements, therefore, this approach is not flexible.

Operating on the data in the spatial domain requires increased memory capacity as compared to compressed domain processing. In the spatial domain, the motion compensation is readily calculated and applied to successive frames of an image. However, when operating in the compressed domain motion compensation is not as straightforward as a motion vector pointing back to a previous frame since the error values are no longer spatial values, i.e., the error values are not pixel values when operating in the compressed domain. Additionally, methods capable of efficiently handling compressed domain data are not available. Prior art approaches have focused mainly on transcoding, scaling and sharpening compressed domain applications. Additionally, inverse compensation applications for the compressed domain tend to give poor peak signal to noise ratio (PSNR) performance and at the same time have an unacceptably slow response time in terms of the amount of frames per second that can be displayed.

As a result, there is a need to solve the problems of the prior art to provide a method and apparatus that minimizes the demands on memory for decoding low bit rate video data.

SUMMARY OF THE INVENTION

Broadly speaking, the present invention fills these needs by providing a video decoder configured to minimize the memory requirements through the use of a hybrid data structure. It should be appreciated that the present invention can be implemented in numerous ways, including as a method, a system, computer readable media or a device. Several inventive embodiments of the present invention are described below.

In one embodiment, a method for reducing the memory requirements for decoding a bit stream is provided. The method initiates with receiving a video bit stream. Then, a frame of the bit stream is decoded into a transform (e.g., a discrete cosine transform (DCT)) domain representation. Next, non-zero coefficients of the transform domain representation are identified. Then, a hybrid data structure is assembled. The hybrid data structure includes a fixed size array and a variable size overflow vector. Next, the non-zero coefficients of the transform domain representation are inserted into the hybrid data structure.

In another embodiment, a method for decoding video data is provided. The method initiates with receiving a frame of video data within a compressed bit stream. Then, a block of the frame is decoded into a transform (e.g., DCT) domain representation in the compressed domain. Next, a hybrid data structure is defined. Then, data associated with the transform domain representation is stored in the hybrid data structure. Next, inverse motion compensation is performed on the data associated with the transform domain representation in the compressed domain. After performing the inverse motion compensation on the data, the data is decompressed for display.

In yet another embodiment, computer readable media having program instructions for rearranging low rate bit stream data for storage into a hybrid data structure is provided. The computer readable media includes program instructions for identifying non-zero transform (e.g., DCT) coefficients associated with a coded block of a frame of data. Program instructions for arranging the non-zero transform coefficients into a fixed size array are included. Program instructions for determining if a quantity of the non-zero transform coefficients exceeds a capacity of the fixed size array are provided. Program instructions for storing the non-zero transform coefficients exceeding the capacity of the fixed size array in a variable size overflow vector and program instructions for translating the non-zero transform coefficients from a compressed domain to a spatial domain are included.

In still yet another embodiment, a circuit is provided. The circuit includes a video decoder integrated circuit chip. The video decoder integrated circuit chip includes circuitry for receiving a bit stream of data associated with a frame of video data. Circuitry for decoding the bit stream of data into a transform (e.g., DCT) domain representation is included in the video decoder. Circuitry for arranging non-zero transform coefficients of the transform domain representation in a hybrid data structure in a memory associated with the video decoder is provided. Circuitry for decompressing the non-zero transform coefficients of the transform domain representation for display is also provided.

In another embodiment, a device configured to display an image is provided. The device includes a central processing unit (CPU), a random access memory (RAM), and a display screen configured to present an image. Decoder circuitry configured to transform a video bit stream into a transform (e.g., DCT) domain representation is included. The decoder circuitry is capable of arranging non-zero transform coefficients of the transform domain representation in a hybrid data structure in a memory associated with the decoder circuitry. The decoder circuitry includes circuitry for selectively applying a hybrid factorization/integer approximation technique during inverse motion compensation. A bus in communication with the CPU, the RAM, the display screen and the decoder circuitry is also included.

Other aspects and advantages of the invention will become apparent from the following detailed description, taken in conjunction with the accompanying drawings, illustrating by way of example the principles of the invention.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will be readily understood by the following detailed description in conjunction with the accompanying drawings, and like reference numerals designate like structural elements.

DESCRIPTION OF THE PREFERRED EMBODIMENTS

Figure 1:
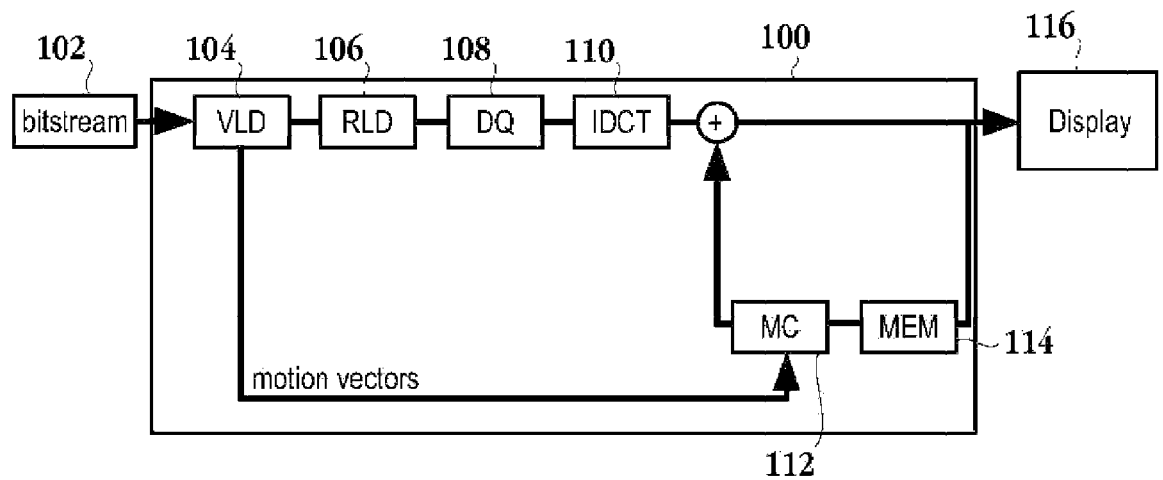
FIG. 1 is a schematic diagram of a video decoder for decoding video data and performing motion compensation in the spatial domain.

An invention is described for a system, apparatus and method for minimizing memory capacity for compressed domain video decoding. It will be apparent, however, to one skilled in the art, in view of the following description, that the present invention may be practiced without some or all of these specific details. In other instances, well known process operations have not been described in detail in order not to unnecessarily obscure the present invention. FIG. 1 is described in the "Background of the Invention" section. The term about as used to herein refers to +/−10% of the referenced value.

The embodiments described herein provide data structures that enable the reduction of the memory used while decoding video data in the compressed domain. In one embodiment, the video decoding pipeline is rearranged such that the current frame is stored, and the inverse motion compensation is performed, in the frequency domain, i.e., compressed domain. Hybrid data structures allow for the manipulation of the data in the compressed domain without computational cost or any significant loss of data. In one embodiment, the hybrid data structures take advantage of the fact that there are only a small number of non-zero discrete cosine transform (DCT) coefficients within a coded block. Thus, only the non-zero DCT coefficients of the entire frame are stored, thereby reducing the memory requirements. As will be explained in more detail below, the hybrid data structure includes a fixed size array and a variable size overflow vector. The variable size overflow vector stores the non-zero DCT coefficients of the coded blocks that exceed the capacity of the fixed size array.

Figure 2:
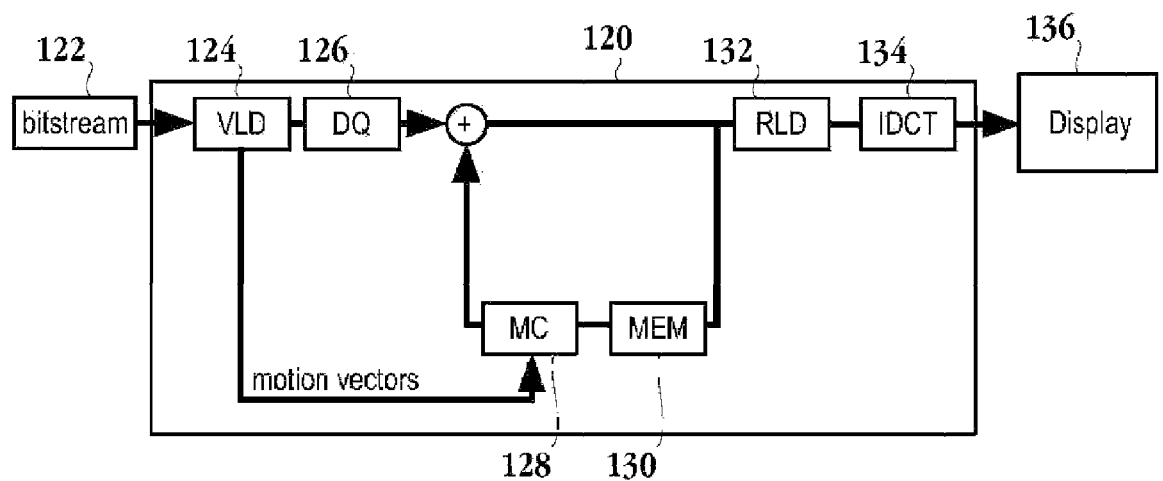
FIG. 2 is a schematic diagram of a video decoder arranged such that inverse motion compensation is performed in the compressed domain in accordance with one embodiment of the invention.

FIG. 2 is a schematic diagram of a video decoder arranged such that inverse motion compensation is performed in the compressed domain in accordance with one embodiment of the invention. Here, bit stream 122 is received by video decoder 120. The first two stages variable length decoder (VLD) stage 124 and dequantization (DQ) stage 126, decode the compressed bit stream into a DCT domain representation. The DCT domain representation is stored in memory (MEM) 130, also referred to as a frame buffer, for use in motion compensation (MC) stage 128. Run length decoder (RLD) stage 132 and inverse DCT (IDCT) stage 134 is performed after the motion compensation feedback loop which contains MC 128 and MEM 130. Thus, the internal representation of the block being decoded is kept in the compressed domain. There are only a small number of nonzero DCT coefficients within a coded block, therefore, this characteristic can be exploited by developing data structures for MEM 130 that store only the nonzero DCT coefficients of each block in the frame. As will be shown in more detail below, the memory compression enabled through the hybrid data structures can reduce memory usage by 50% without any loss in video quality. Since the human visual system is more sensitive to the lower order DCT coefficients than the higher order DCT coefficients, thresholding schemes that filter out higher order DCT coefficients and tradeoff memory usage versus changing power or peak signal to noise ratio (PSNR) requirements are developed as described below.

Accordingly, a complete compressed domain video decoding pipeline that is optimized for both fast and memory efficient decoding is described herein. In one embodiment, TELENOR's video decoder, which is a public domain H.263 compliant decoder, is used for the testing referred to herein. It should be appreciated that while some of the embodiments described below refer to a H.263 bit stream, the embodiments are not limited to operating on a H.263 bit stream. That is, any DCT based compressed bit stream having video data, e.g., Motion Picture Expert Group (MPEG) 1/2/4, H.261, etc. may be employed. A number of fast inverse motion compensation algorithms for the discrete cosine transform (DCT) domain representation enable the efficient processing in the compressed domain. It should be appreciated that memory compression methods that store the nonzero DCT coefficients within a coded block allow for the reduction in memory requirements due to the compressed domain processing. Additionally, performance of the video decoder using compressed domain processing with the inverse motion compensation techniques and memory compression described herein is evaluated along three dimensions: computational complexity, memory efficiency, and PSNR, to show the various performance tradeoffs in optimizing for both speed and memory.

Figure 3:
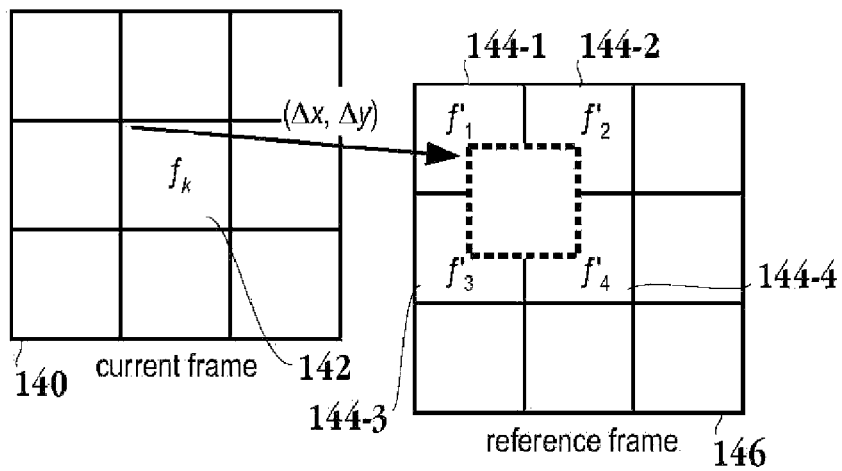
FIG. 3 is a schematic diagram illustrating inverse motion compensation as peformed in the spatial domain.

FIG. 3 is a schematic diagram illustrating inverse motion compensation as peformed in the spatial domain. Here, a prediction of the current block is performed from motion compensated blocks in the reference frame. The current 8×8 spatial block, $f_k$ 142, of current frame 140 is derived from four reference blocks $f'_1$, $f'_2$, $f'_3$, and $f'_4$, 144-1 through 144-4, respectively, in reference frame 146. The reference blocks are selected by calculating the displacement of $f_k$ by the motion vector ($\Delta x$, $\Delta y$) and choosing those blocks that the motion vector intersects in the reference frame. For ($\Delta x>0$, $\Delta y>0$), $f_k$ is displaced to the right and down. From the overlap of $f_k$ with $f'_1$, we can determine the overlap parameters (w, h) and also the parameters (8-w, h), (w, 8-h), and (8-w, 8-h) with the neighboring blocks.

$$f_k = \sum_{i=1}^{4} c_{i1} f'_i c_{i2} \quad (2)$$

Since each block can be represented as an 8×8 matrix, the reconstruction of matrix $f_k$ can be described as the summation of windowed and shifted matrices $f'_1, \ldots, f'_4$. In equation (Eq.) (2), the matrices $c_{ij}$, i=1, ..., 4, j=1,2, perform the windowing and shifting operations on $f'_1$. The matrices $c_{ij}$ are sparse 8×8 matrices of zeroes and ones. Also, $c_{ij}$ is a function of the overlap parameters (w, h) and is defined as $$c_{11} = c_{21} = U_h = \begin{pmatrix} 0 & I_h \\ 0 & 0 \end{pmatrix} \quad (3)$$

$$c_{12} = c_{32} = L_w = \begin{pmatrix} 0 & 0 \\ I_w & 0 \end{pmatrix} \quad (4)$$

where $I_h$ and $I_w$ are identity matrices of dimension h×h and w×w, respectively. Similarly, $$c_{31} = c_{41} = L_{8-h} \quad (5)$$

$$c_{22} = c_{42} = L_{8-w} \quad (6)$$

The inverse motion compensation in the DCT-domain reconstructs intracoded blocks from motion compensated intercoded blocks. The concept is similar to the spatial domain except that all coefficients are kept in the DCT-domain, i.e. reconstruct $F_k$, the DCT of $f_k$, directly from $F'_1, \ldots, F'_4$, the DCT off $f'_1, \ldots, f'_4$.

S is defined as a matrix that contains the 8×8 basis vectors for a two-dimensional DCT. Using the unitary property of the DCT transform, $S^t S=I$, it can be demonstrated that Eq. (2) is equivalent to $$f_k = \sum_{i=1}^{4} c_{i1} S^t S f'_i S^t S c_{i2} \qquad (7)$$

Premultiplying both sides of Eq. (7) by S, and postmultiplying by $S^t$, results in:

$$F_k = \sum_{i=1}^{4} C_{i1} F'_i C_{i2} \qquad (8)$$

where $C_{ij}$ is the DCT of $c_{ij}$. Eq. (8) calculates $F_k$ as a summation of pre- and post-multiplied terms $F'_1, \ldots, F'_4$. The matrix $C_{ij}$ is a single composite matrix that contains the sequence of transformations: inverse DCT, windowing, shifting, and forward DCT. Thus, Eq. (8) describes a method to calculate $F_k$ directly from $F'_1, \ldots, F'_4$ using only matrix multiplications. These matrix multiplications operate in the DCT-domain without having to explicitly transform between the spatial and frequency domains. However, the matrix multiplications described are unacceptably slow. In turn, only about 5 frames per second can be displayed which results in a poor quality display. The DCT-domain inverse motion compensation algorithms described below focus on reducing the computational complexity of these matrix multiplications as the matrix multiplications become a bottleneck causing unacceptable delays.

Low bit rate video, i.e., video data having bit rates less than about 64 kilobits per second, is targeted for applications such as wireless video on cellular phones, personal digital assistants PDAs, and other handheld or battery operated devices, as well as being used for video conferencing applications. The H.263 standard is an exemplary standard that specifies the bit stream syntax and algorithms for video coding at low bit rates. The algorithms include transform coding, motion estimation/compensation, coefficient quantization, and run-length coding. Besides the baseline specification, version 2 of the standard also supports sixteen negotiable options that improve coding performance and provide error resilience.

Figure 4:
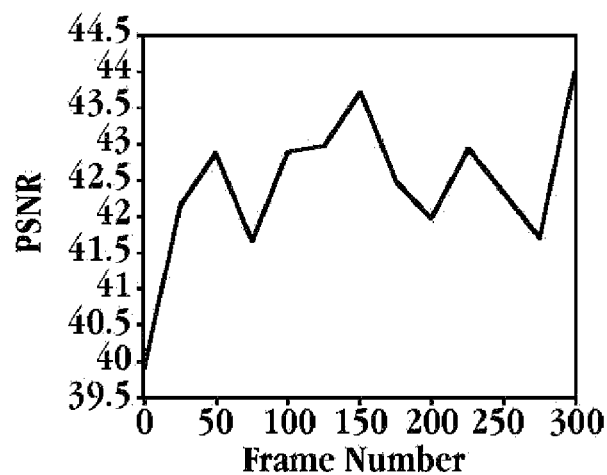
FIG. 4 is a graph illustrating the peak signal to noise ratio (PSNR) for a plurality of frames to demonstrate the effectiveness of a forced update mechanism associated with the H.263 standard.

Video encoded at low bit rates can become visibly distorted, especially those classified with high action, i.e., active motion blocks. As mentioned above, the embodiments described herein refer to the H.263 standard, however any suitable video codec standard can be employed with the embodiments. Some of the characteristics of the features of the H.263 standard are discussed below for informational purposes and are not meant to limit the invention for use with the H.263 standard. One characteristic of the H.263 standard is the absence of the group of pictures (GOP) and higher layers in the H.263 standard. Where baseline encoded sequences composed of just a single intraframe (I frame) followed by a long sequence of interframes (P frames), the long sequence of P frames provides greater compression ratios since the temporal redundancy is removed between consecutive frames. However, motion estimation/motion compensation (ME/MC) also creates a temporal dependency such that errors generated during the lossy coding process will accumulate during the decoding process. The lack of I frames prevents the decoder from breaking this accumulation of errors. The H.263 standard has a forced update mechanism such that the encoder must encode a macroblock as an intrablock at least once every 132 times during the encoding process. FIG. 4 is a graph illustrating the effectiveness of the forced update mechanism. As illustrated in FIG. 4, the PSNR of the video fluctuates randomly but does not drift in any one direction for frames later in the sequence.

Figure 5:
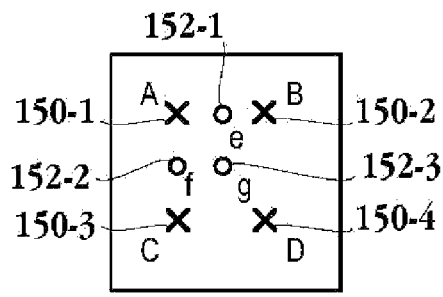
FIG. 5 is a schematic diagram illustrating the determination of half pixel values in the H.263 standard.

FIG. 5 is a schematic diagram illustrating the determination of half pixel values in the H.263 standard. As is well known, the H.263 standard uses half pixel interpolation for motion compensation. In the standard, half pixel interpolation is indicated by motion vectors with 0.5 resolution (i.e. <7.5, 4.5>). The encoder can specify interpolation in the horizontal direction only, vertical direction only, or both horizontal and vertical directions. As illustrated by FIG. 5, half pixel values are found by bilinear interpolation of integer pixel positions surrounding the half pixel position. Pixel position A 150-1, pixel position B 150-2, pixel position C 150-3, and pixel position D 150-4, represent integer pixel positions, while position e 152-1, position f 152-2, and position g 152-3 represent half pixel positions. Interpolations in the horizontal direction may be represented as e=(A+B+1)>>1 and interpolations in the vertical direction may be represented as f=(A+C+1)>>1. Interpolations in the horizontal and vertical directions may be represented as g=(A+B+C+D+2)>>2

Figure 6A:
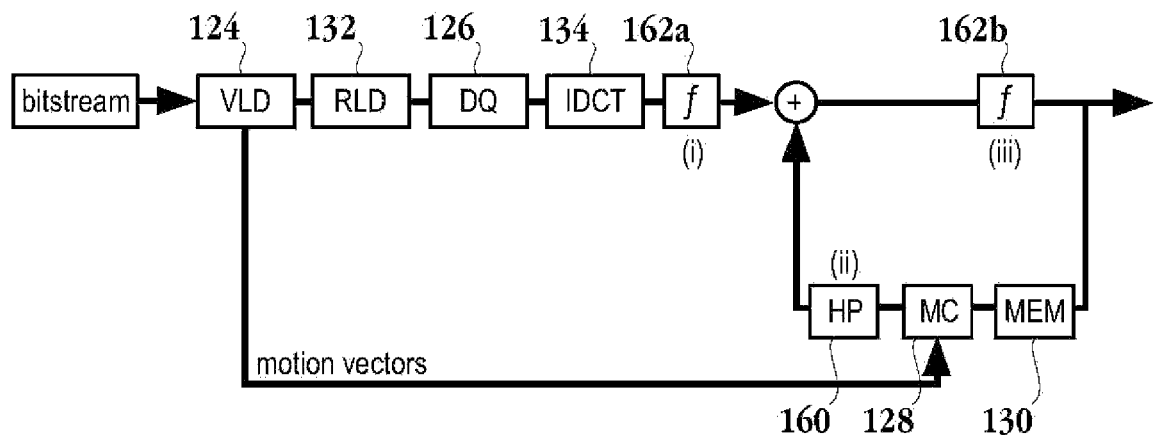
FIG. 6A is a schematic diagrams of a baseline spatial video decoder.
Figure 6B:
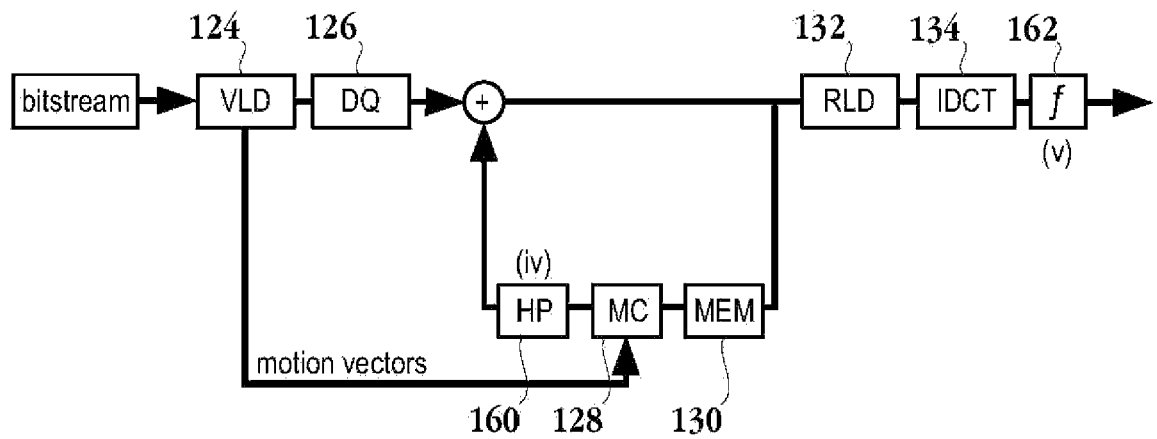
FIG. 6B is a schematic diagram of a compressed domain video decoder in accordance with one embodiment of the invention.

FIGS. 6A and 6B are schematic diagrams of a baseline spatial video decoder and a compressed domain video decoder, respectively. The block diagram of FIG. 6B rearranges some of the functional blocks of the spatial domain video decoder of FIG. 6A. In particular, RLD 132 and IDCT 134 are moved after MC 128 feedback loop. This arrangement keeps the internal representation of the video in the compressed domain. The arrangement of FIG. 6B allows for the insertion of compressed domain post processing modules right after MC 128 feedback loop. It should be appreciated that certain video manipulations, such as compositing, scaling, and deblocking, to name a few, are faster in the compressed domain over their spatial domain counterparts. However, from the video codec point of view, a spatial encoder is not perfectly matched to a compressed domain decoder. As shown in FIG. 6B, the compressed domain video decoder differs from that of the spatial domain video decoder of FIG. 6A at several points along the decoding pipeline. More than just a rearrangement of blocks, the points of difference represent nonlinear operations, such as clipping and rounding. These points of nonlinearity generate video with differing PSNR measurements between the two domains.

The nonlinear points are labeled as (i), (ii), (iii), (iv), and (v). In the spatial decoder of FIG. 6A, IDCT block 134 transforms the incoming 8×8 block from the frequency domain to the spatial domain. The spatial domain values represent either pixel values or prediction error values for the color channels (Y, Cr, Cb). At point (i) of FIG. 6A, the spatial values are clipped to the range (−255≦x≦256). Note that there is no equivalent clipping operation at this stage for the DCT coefficients in FIG. 6B. The second point of difference occurs during motion compensation. MC block 128 in FIG. 6A returns the pixel values from MEM 130 referenced by the current motion vector. At point (ii) of FIG. 6A, half-pixel (HP) interpolation 160, if specified, averages the neighboring pixel values and rounds the result to the nearest positive integer. At point (iv) of FIG. 6B, half-pixel (HP) interpolation 160 operates directly on DCT coefficients and rounds the result to the nearest positive or negative integer. Another point of difference occurs after the addition of the prediction error to the prediction value. At point (iii) of FIG. 6A, the sum represents pixel values, which are clipped at block 162b to the range (0≦x≦255). Note that in FIG. 6B similar clipping of pixel values is moved from the motion compensation feedback loop to the last stage of the decoding pipeline at block 162 (point v).

One skilled in the art will appreciate that, MEM 130 is a frame buffer that stores the previous frame for motion compensation. For the spatial domain decoder, the frame buffer allocates enough memory to store the (Y, Cr, Cb) values for the incoming frame size. For example, CIF video sampled at 4:2:0 requires about 200 kilobytes of memory. As MEM 130 is the single greatest source of memory usage in the video decoder, a hybrid data structure and inverse motion compensation methods defined herein allow for the reduction of MEM usage for a compressed domain decoding pipeline. In one embodiment, two to three times memory compression, without any significant loss in the quality of the decoded video, is achieved.

Figure 7:
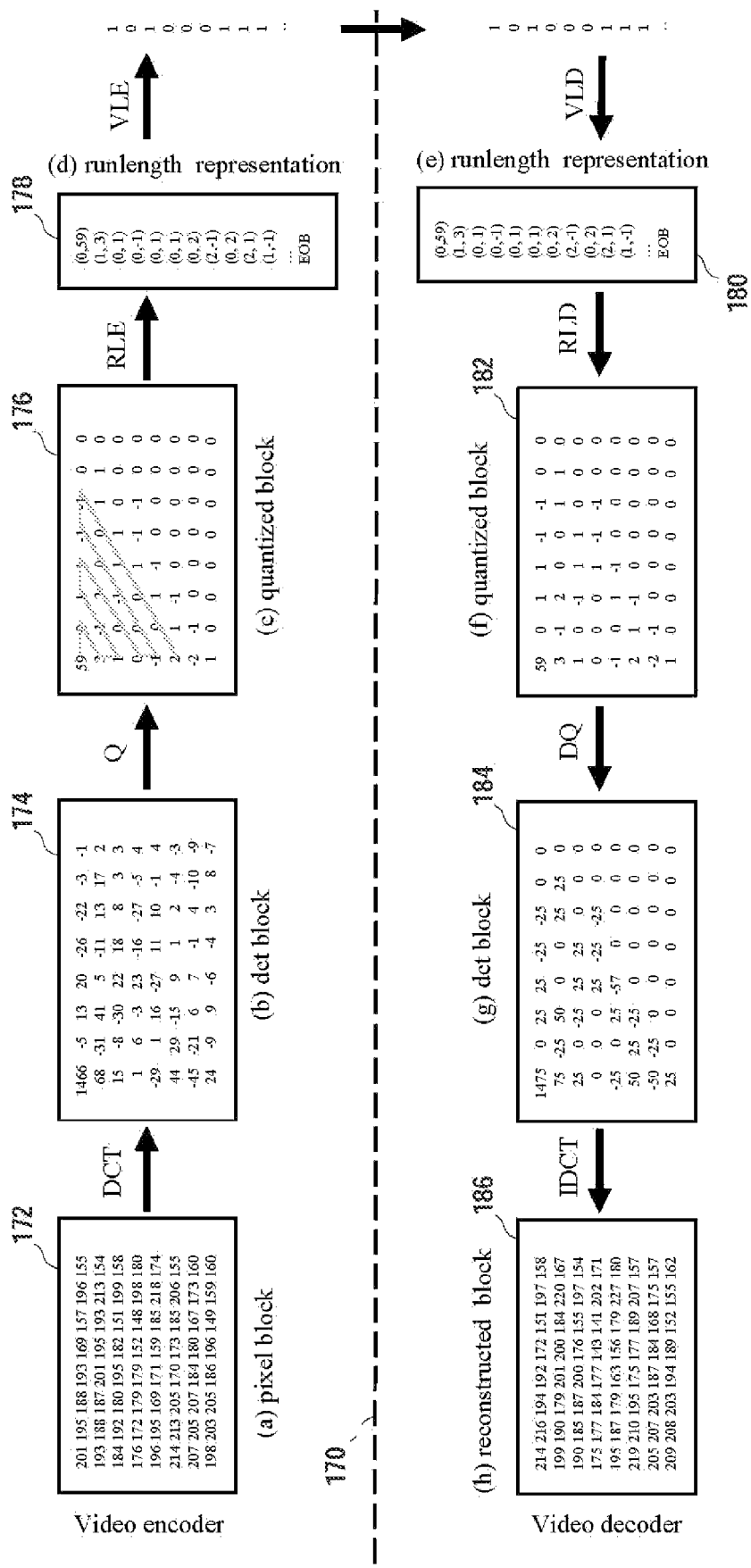
FIG. 7 is a block diagram illustrating the block transformations during the video encoding and decoding process in accordance with one embodiment of the invention.

FIG. 7 is a block diagram illustrating the block transformations during the video encoding and decoding process in accordance with one embodiment of the invention. The sequence of transformations above dotted line 170 describes the spatial compression methods used by the video encoder for a block in an I-frame or a block in a P-frame after motion compensation/motion estimation. Pixel block 172 is a full 8×8 matrix. At this point, any compression or truncation in the spatial domain directly affects the perceived quality of the reconstructed block. After the DCT transform, however, transformed matrix 174 is compact with the larger terms at low frequencies. The quantization step further compacts the block by reducing to zero the smaller terms at high frequencies in block 176. The zigzag scan highlighted in block 176 orders the DCT coefficients from low to high frequency. The runlength encoding discards the zero coefficients and represents only the nonzero DCT coefficients in a compact list of two-valued elements, e.g., run and level, in runlength representation 178. Thus, memory compression in the DCT domain can be achieved by developing efficient data structures and methods that store and access runlength representations of the nonzero DCT coefficients.

In one embodiment, a semi-compressed (SC) representation is one such memory efficient runlength representation. The runlength representation of the nonzero DCT coefficients similar to runlength representations 178 and 180 of FIG. 7. However, there are two modifications. Each two-valued element (run, level) is described by a composite 16-bit value of the form:

$$RL = \text{binary 'rrrrlllllllllllll'} \quad (9)$$

The 12 least significant bits ('llllllllllll') define the value of the dequantized DCT coefficient from block 184, which were derived from quantized block 182. It should be appreciated that block 184 is an example of a DCT domain representation. It will be apparent to one skilled in the art that the value of the DCT coefficients can range from −2048 to 2047. Block 186 of FIG. 7 is a reconstructed block of block 172 after an IDCT operation is performed on block 184. The four most significant bits ('rrrr') define the value of the run. The run represents the position of the nonzero DCT coefficient relative to the position of the last nonzero DCT coefficient according to the zigzag scan in an 8×8 block. Since the run of a nonzero coefficient may exceed 15, an escape sequence is defined to split the run into smaller units. The escape sequence RL='F0' is defined to represent a run of 15 zero coefficients followed by a coefficient of zero amplitude.

In order to reduce the memory requirements, data structures to store and access the SC representation must be developed. The following data structures were considered: array, linked list, vector, and hybrid. In developing these structures, a balance between the need for memory compression and the need to maintain low computational complexity is taken into consideration and discussed further with reference to Table 1 below. While the SC representation provides the targeted memory compression, certain data structures will greatly increase the computational complexity of the decoder in three areas. First, by employing the two-byte representation, the values of the (run, level) are not immediately available. Functions to pack and unpack the bits are needed for every access and modification to these values. Secondly, motion compensation is now complicated by the compact runlength representation. Thirdly, sort and merge operations are needed to add the prediction error to the prediction.

Figure 8:
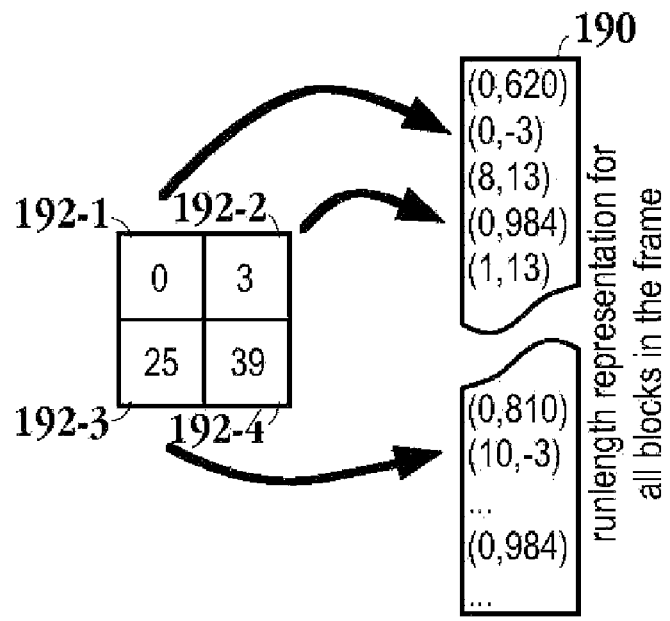
FIG. 8 is a schematic diagram illustrating the use of a separate index to find the starting position of each 8×8 block in a run length representation.

FIG. 8 is a schematic diagram illustrating the use of a separate index to find the starting position of each 8×8 block in the runlength representation. If a single list 190, also referred to as vector, is used to store the runlength representation for all 8×8 blocks 192-1 through 192-4 in a frame, then access to a particular DCT block during motion compensation requires a separate index to lookup its start position, which complicates the motion compensation.

Figure 9B:
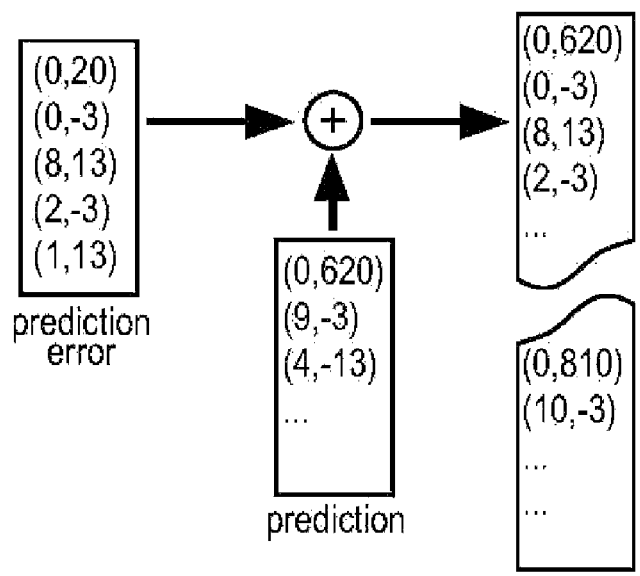
FIGS. 9A and 9B illustrate the sort and merge operations needed to add the prediction error to the prediction for an array-based data structure and a list data structure, respectively.
Figure 9A:
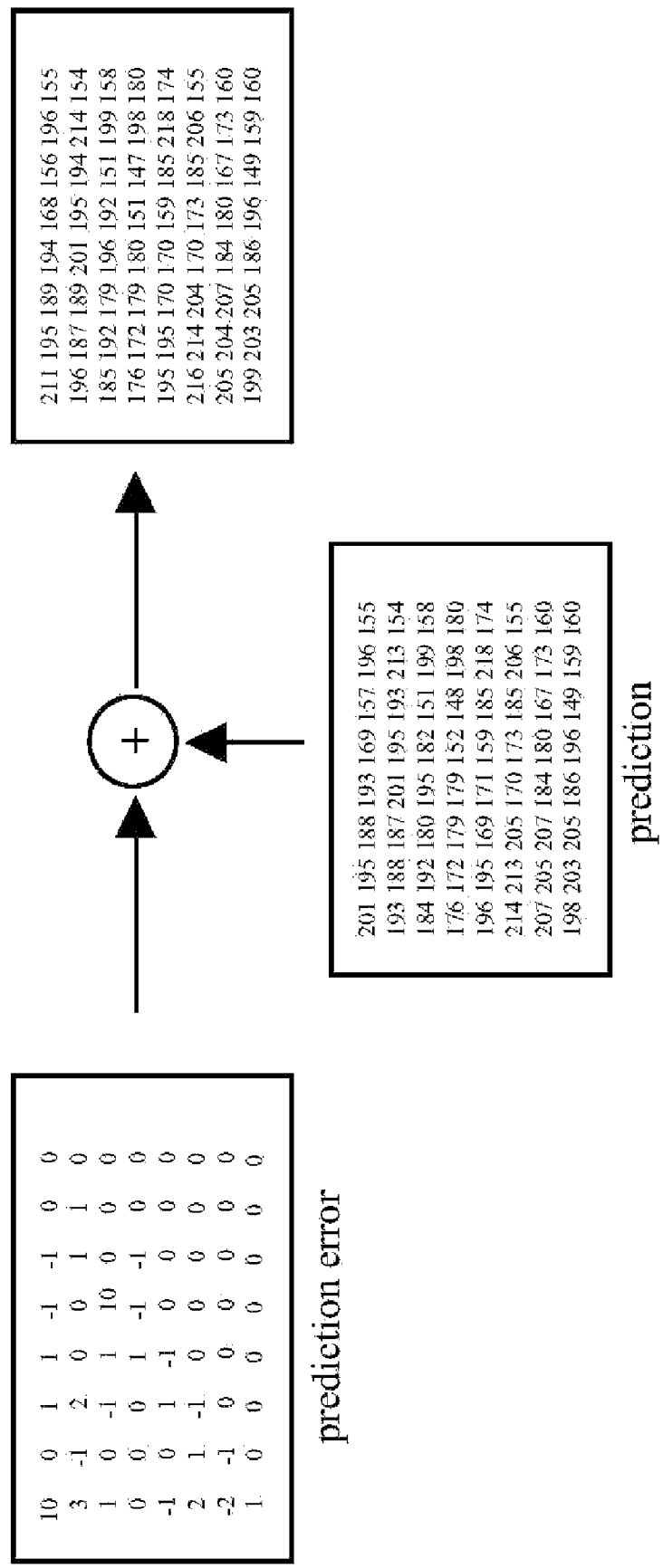

FIGS. 9A and 9B illustrate the sort and merge operations needed to add the prediction error to the prediction for an array-based data structure and a list data structure, respectively. In FIG. 9A an array-based data structure requires only the addition of values at corresponding array indices. However, the array based data structure does not offer memory compression advantages. In FIG. 9B, a list (or vector) data structure requires additional sort and merge operations. That is, the merge algorithm requires insertion and deletion functions, which can be very expensive in terms of computational complexity for data structures such as vectors. More particularly, if indices are equal then the DCT coefficients can be added or subtracted, e.g., (0,20)+(0,620)=(0,640). DCT coefficients are inserted if index in error precedes that in prediction, e.g., insert (0,−3). DCT coefficients are deleted if addition of DCT values equals 0, e.g., (1,13)+(4,−13)=(1,0).

Table 1 compares the memory compression ratios and computational costs for various data structures. While array-based data structures incur no additional computational costs besides the 64 additions needed for the prediction updates, an array of DCT coefficients provides no memory compression over the array of pixels since each DCT coefficient needs two-bytes instead of one for storage. A linked list or vector of semi-compressed (SC) representation provides up to 2.5 times memory compression over the array of pixels. However, neither solution is optimal since the insertion/deletion cost for a vector is expensive, especially insertions and deletions in the middle of the vector and the memory overhead for a linked list is expensive, as internal pointers are created for every element in the list.

TABLE 1

| Data Structure | Memory Size (kilobytes) | Insertion/Deletion Cost | Memory Overhead | Compression Ratio |
|---|---|---|---|---|
| Array of Pixels | 152 | None | None | None |
| Array of DCT | 304 | None | None | None |
| Vector of SC | 60 | Expensive | Minimal | 2.5:1 |

TABLE 1-continued

| Data Structure | Memory Size (kilobytes) | Insertion/ Deletion Cost | Memory Overhead | Compression Ratio |
|---|---|---|---|---|
| Linked List of SC | 60 + overhead | Moderate | Expensive | 2.5:1 (w/o overhead) |
| Hybrid of SC | 70 | Moderate | Minimal | 2.2:1 |

A hybrid data structure for the SC representation provides the optimum balancing of the competing interests of Table 1. The hybrid data structure is developed to take advantage of the low computational cost of the array structure of FIG. 9A and the high compression ratio of the vector structure of FIG. 9B. The hybrid data structure consists of a fixed-size array that holds a fixed number of DCT coefficients per block and a variable-size overflow vector that stores the DCT coefficients of those blocks that exceed the fixed size array allocation. It should be appreciated that the fixed size array can be configured to hold any suitable number of DCT coefficients per block, wherein the number of DCT coefficients is less than 64. Of course, as the fixed size array becomes greater the amount of memory compression is decreased. In one embodiment, the fixed size array is configured to hold 8 DCT coefficients per block.

Figure 10:
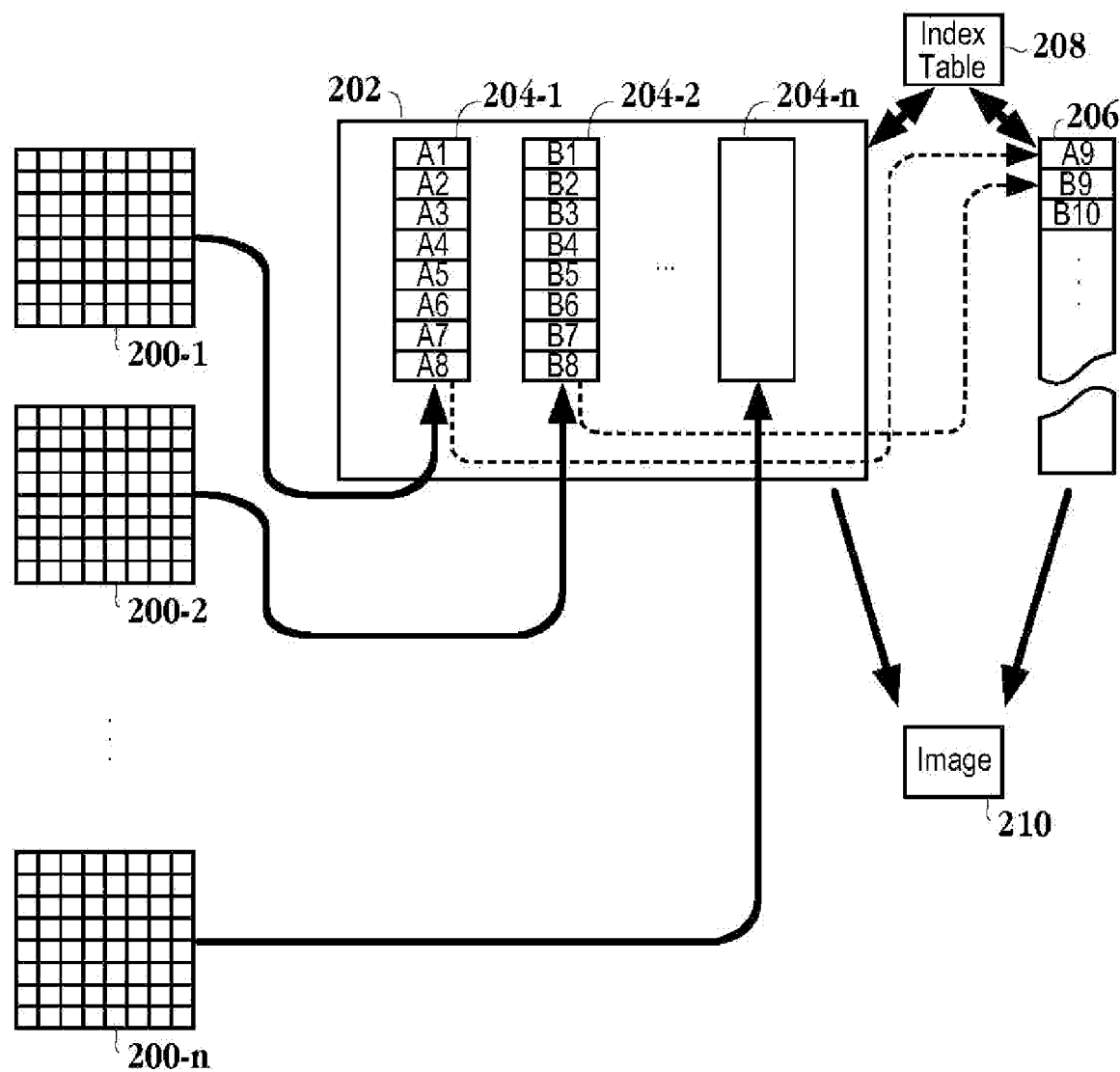
FIG. 10 is a schematic diagram of a hybrid data structure including an array structure and a vector structure to allow for memory compression and computational efficiency in accordance with one embodiment of the invention.

FIG. 10 is a schematic diagram of a hybrid data structure including an array structure and a vector structure to allow for memory compression and computational efficiency in accordance with one embodiment of the invention. DCT blocks 200-1, 200-2 and 200-n include zero DCT coefficients and non-zero DCT coefficients. It should be appreciated that DCT blocks 200-1 through 200-n represent the DCT domain representation as discussed above with reference to FIG. 2. In addition, blocks 200-1 through 200-n are associated with blocks of a frame of video data, e.g., block 184 of FIG. 7. The non-zero DCT coefficients for each of blocks 200-1 through 200-n are identified and inserted into fixed size array 202 data structure. Fixed size array 202 includes fixed size blocks 204-1 through 204-n. In one embodiment, each block 204-1 through 204-n is sized to store 8 DCT coefficients in an 8×1 data structure. It should be appreciated that the invention is not limited to blocks configured to store 8 DCT coefficients as any suitable size may be used. As stated above, as the capacity of the blocks increases the amount of memory compression decreases.

Still referring to FIG. 10, where there are more than 8 non-zero coefficients in any of DCT blocks 200-1 through 200-n, the non-zero DCT coefficients exceeding the capacity of respective fixed size blocks 204-1 through 204-n are placed in overflow vector 206. Overflow vector 206 is configured as a variable size overflow vector, i.e. the overflow vector is dynamic. For example, block 200-1 includes 9 non-zero DCT coefficients A1-A9. Here, DCT coefficients A1-A8 are copied to fixed size block 204-1, while DCT coefficient A9 is copied to overflow vector 206. Block 200-2 includes 10 non-zero DCT coefficients B1-B10. Here, DCT coefficients B1-B8 are copied to fixed size block 204-2, while DCT coefficients B9 and B10 are copied to overflow vector 206 and so on for each block of the frame. Index table 208 contains entries which identify corresponding fixed size blocks 204-1 through 204-n for the entries in overflow vector 206. The size of the index table is negligible as each entry is 1 byte. Accordingly, for a frame of data corresponding to DCT blocks 200-1 through 200-n, data from fixed size array 202 and overflow vector 206 are combined to produce image 210. It should be appreciated that the savings in memory is substantial. That is, DCT blocks 200-1 through 200-n are reduced from 64 zero and non-zero coefficients to 8 non-zero coefficients, or less, stored in fixed size blocks 204-1 through 204-n in most instances. Of course, more or less non-zero coefficients may be provided, wherein the non-zero coefficients in excess of 8 are stored in overflow vector 206.

Figure 11A:
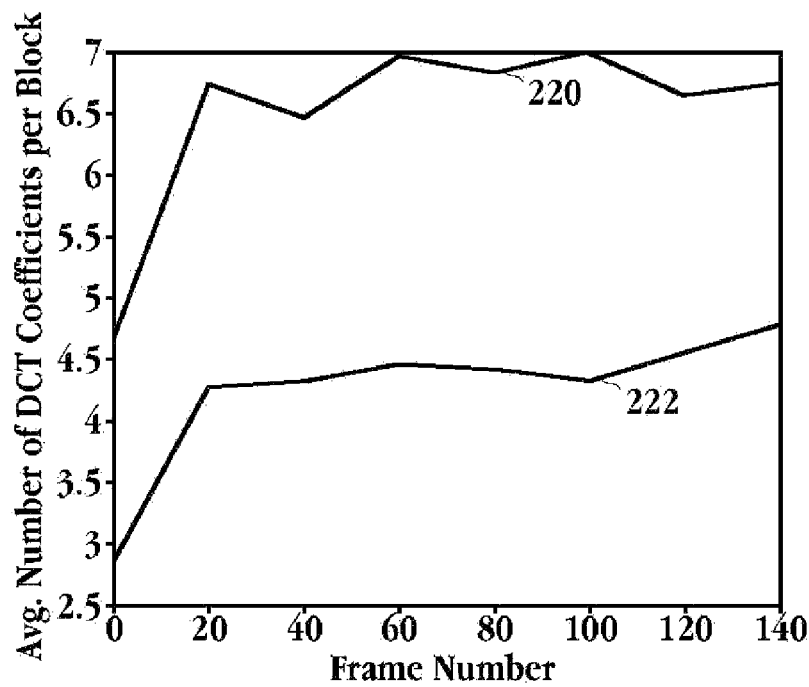
FIGS. 11A through 11C are graphs illustrating the factors evaluated in determining the capacity of the fixed size blocks of the fixed size array and the overflow vector of the hybrid data structure in accordance with one embodiment of the invention.
Figure 11B:
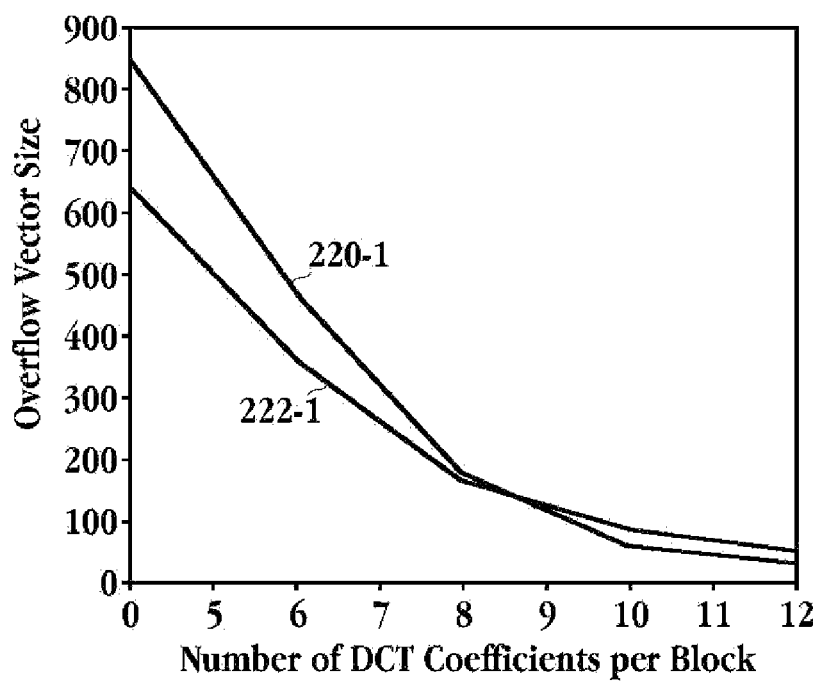
Figure 11C:
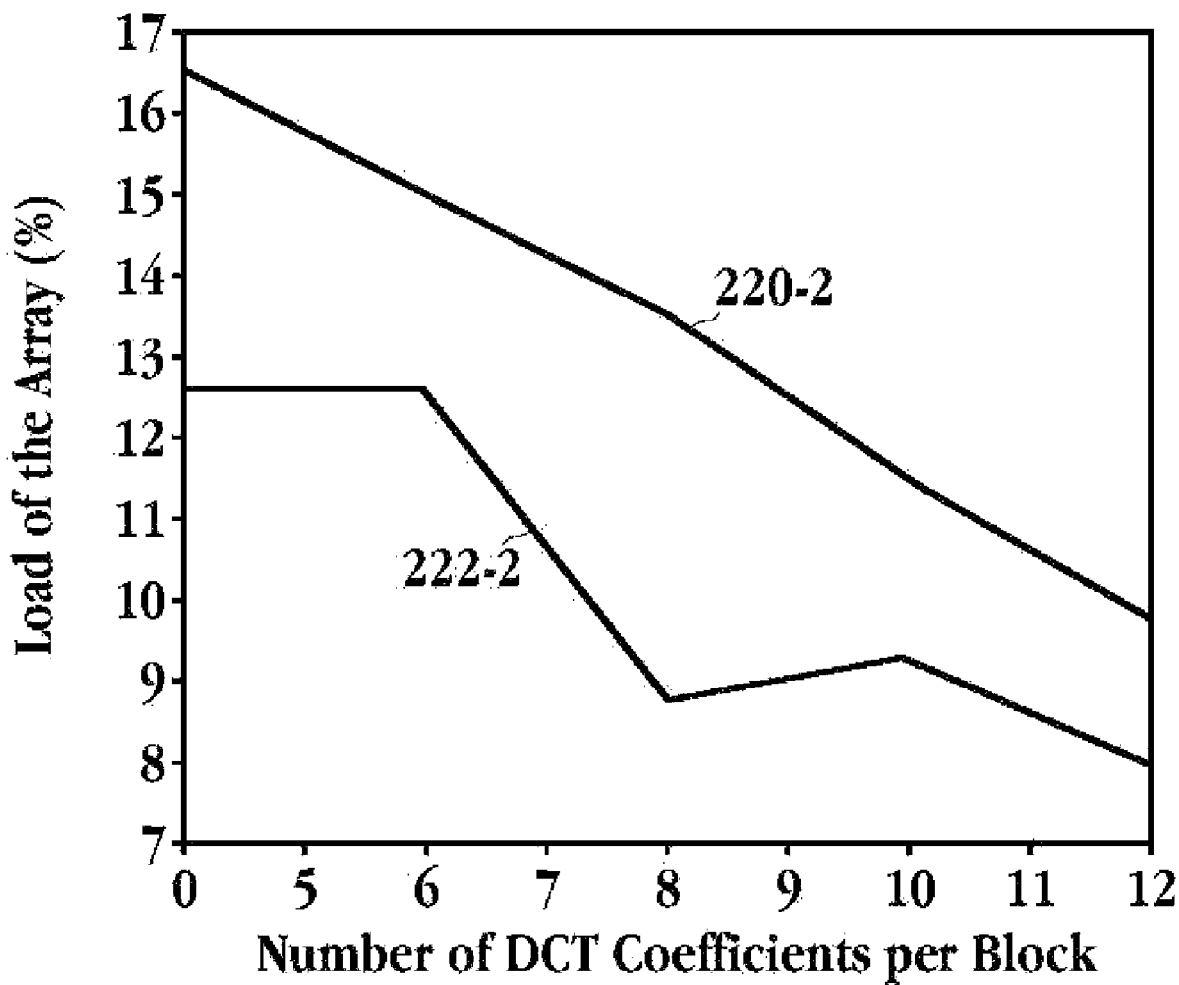

FIGS. 11A through 11C are graphs illustrating the factors evaluated in determining the capacity of the fixed size blocks of the fixed size array and the overflow vector of the hybrid data structure in accordance with one embodiment of the invention. In FIG. 11A, the average number of non-zero DCT coefficients per luminance block for two typical CIF sequences is depicted by lines 220 and 222. The number of non-zero DCT coefficients per block ranges from three to seven. That is, of the 64 coefficients, only 2-7 coefficients are non-zero coefficients on average. Using the information from FIG. 11A as a guide, FIG. 11B illustrates that as the fixed-size array increases, the size of the overflow vector decreases, thereby minimizing the insertion and deletion costs of the vector. Here line 220-1 corresponds to the CIF sequence of line 220 of FIG. 11A, while line 222-1 corresponds to the CIF sequence of line 222 of FIG. 11A. One skilled in the art will appreciate that as the fixed size array increases in terms of capacity, the memory compression decreases. Additionally, FIG. 11C illustrates that the load factor of the array decreases as well, indicating that much of the array remains empty. In one embodiment, a fixed-size array that holds 8 DCT coefficients per block is chosen. Here again, line 220-2 corresponds to the CIF sequence of line 220 of FIG. 11A, while line 222-2 corresponds to the CIF sequence of line 222 of FIG. 11A. This choice minimizes the size of the overflow vector to about 200 DCT coefficients and maintains a load factor of between about 9% and about 15%. It will be apparent to one skilled in the art that the size of the fixed array is not limited to 8 coefficients per block and that any suitable number of coefficients per block may be chosen. Additionally, the individual blocks of the fixed size array may have any suitable configuration. For example, a block capable of holding 8 coefficients may be arranged as an 8×1 block, a 4×2 block, etc., while a block capable of holding 9 coefficients may be arranged as a 9×1 block, 3×3 block, etc.

Figure 12:
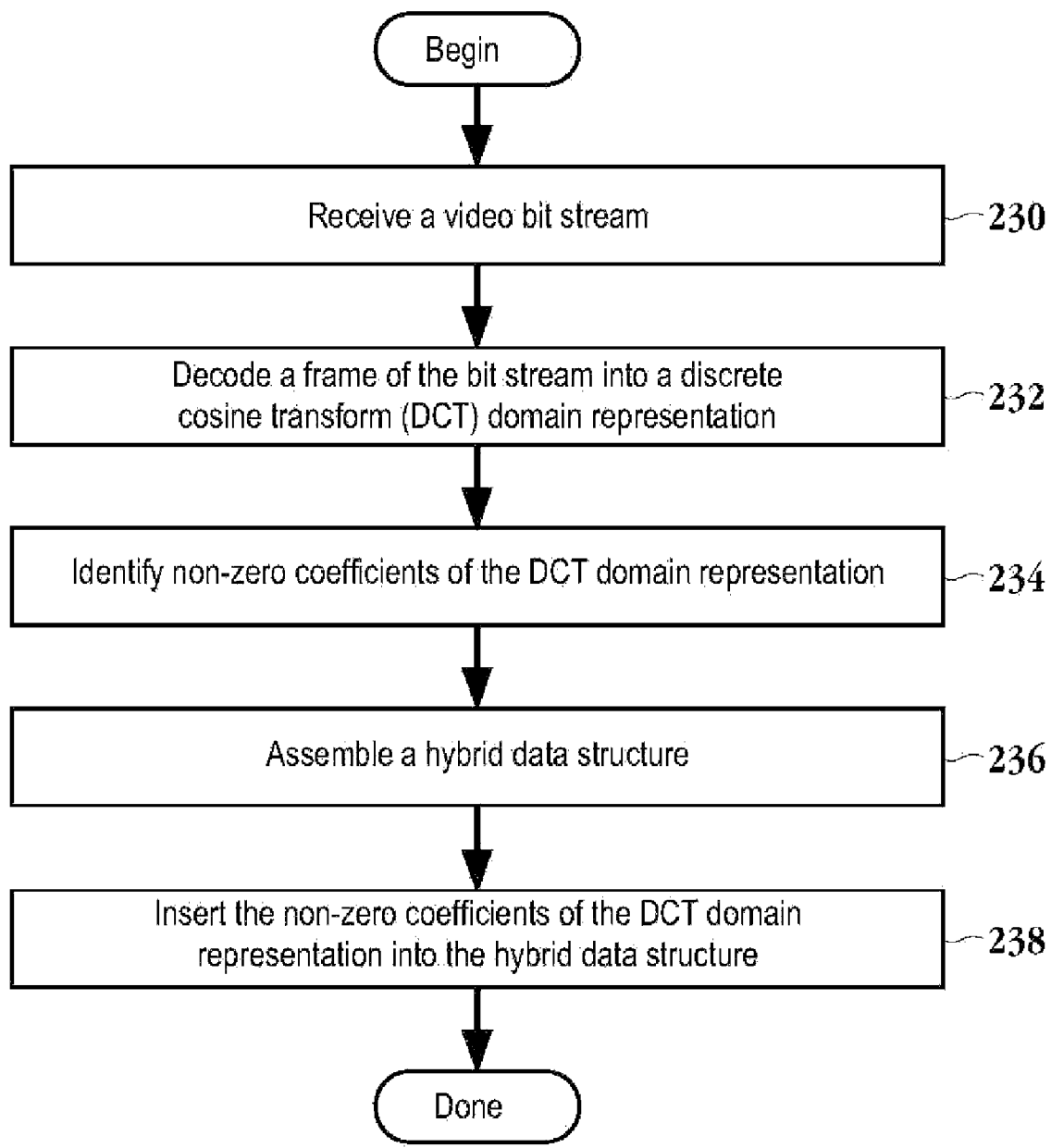
FIG. 12 is a flowchart of the method operations for reducing the memory requirements for decoding a bit stream in accordance with one embodiment of the invention.

FIG. 12 is a flowchart of the method operations for reducing the memory requirements for decoding a bit stream in accordance with one embodiment of the invention. The method initiates with operation 230 where a video bit stream is received. In one embodiment, the bit stream is a low rate bit stream. For example, the video stream may be associated with a video coding standard such as H.263, Motion Pictures Expert Group (MPEG-1/2/4), H.261, Joint Photographic Expert Group (JPEG), etc. The method then proceeds to operation 232 where the frame of the bit stream is decoded into a discrete cosine transform (DCT) domain representation for each block of data associated with the frame. Here, the video is processed through the first two stages of a decoder, such as the decoder of FIGS. 2, 6B and 15. That is, the video data is processed through the variable length decoder stage and the dequantization stage to decode the compressed bit stream into a DCT domain representation. It should be appreciated that the DCT domain representation is in a compressed state format. The frame is decoded one block at a time. The method then moves to operation 234 where the non-zero coefficients of the DCT domain representation are identified. Here, out of the 64 DCT coefficients associated with the DCT domain representation for a block of data, relatively few of the 64 DCT coefficients are typically non-zero coefficients.

Still referring the FIG. 12, the method then moves to operation 236 where a hybrid data structure is assembled. The hybrid data structure includes a fixed size array and a variable size overflow vector. One exemplary hybrid data structure is the fixed size array that includes a plurality of fixed size block and the variable size overflow vector with reference to FIG. 10. The method then proceeds to operation 238 where the non-zero coefficients of the DCT domain representation are inserted into the hybrid data structure. As mentioned with reference to FIG. 10, the non-zero coefficients for a DCT domain representation for a block of video data are associated with a fixed size block in the fixed size array. If the number of non-zero coefficients exceeds the capacity of the fixed size block associated with the block of video data, then the remaining non-zero coefficients are stored in the variable size overflow vector. In one embodiment, an index table maps the data in the overflow vector back to the appropriate fixed size block in the fixed size array. Thus, the memory requirements are reduced through the hybrid data structure and the storage of the non-zero coefficients. More particularly, the memory requirements can be reduced by 50% without any loss of video quality.

It should be appreciated that the non-zero coefficients for each DCT domain representation associated with a frame of data are stored in the hybrid data structure. The stored data for the frame is then combined and decompressed for display. Once the next frame is decoded into a DCT domain representation to be stored in the hybrid data structure, the data in the hybrid data structure associated with the previous frame is flushed, in one embodiment. As will be explained further below, inverse motion compensation is performed on the stored data in the compressed domain. The inverse motion compensation uses integer approximation for full pixel inverse motion compensation and factorization for half pixel inverse motion compensation.

The main components in the spatial H.263 video decoder include runlength decoding, inverse DCT, and inverse motion compensation. Using a timing profiler, the performance of TELENOR'S H.263 video decoder on a 1.1 GHz Pentium 4 processor is measured for baseline data. Decoding a baseline video and ignoring system calls, the profiler measures the overall time it takes to decode 144 frames and details the timing characteristics of each component. Table 2 is a timing profile for the spatial H.263 video decoder and highlights the timing results for select functions.

TABLE 2

| Function | Function Time (ms) | Hit Count |
|---|---|---|
| Picture Display | 772 | 144 |
| Inverse Motion Compensation | 243 | 56336 |
| Runlength Decoding | 57 | 39830 |
| Inverse DCT | 3 | 42253 |

Table 3 is timing profile for the non-optimized compressed domain H.263 video decoder. One exemplary decoder pipeline configuration is the decoder with reference to FIG. 2.

TABLE 3

| Function | Function Time (ms) | Hit Count |
|---|---|---|
| Inverse Motion Compensation | 9194 | 56336 |
| Picture Display | 1547 | 144 |
| Runlength Decoding | 32 | 39830 |
| Inverse DCT | 652 | 340197 |

As shown in Table 2, the spatial domain video decoder takes about 1.2 seconds to decode 144 frames. The majority of the time is spent in the PictureDisplay function, which converts the color values of each frame from YUV to RGB in order to display it on a suitable operating system, such as WINDOWS™. Functions such as runlength decoding, inverse DCT, and inverse motion compensation take about 25% of the total time required to decode the video. Inverse motion compensation is especially fast in the spatial domain. Here, full pixel motion compensation simply sets a pointer to a position in memory or a frame buffer and copies a block of data, while half pixel motion compensation sets a pointer in memory and interpolates values using the shift operator. In contrast, Table 3 highlights some of the timing results for a non-optimized compressed domain video decoder. The non-optimized compressed domain decoder takes about 13.67 seconds to decode the same 144 frames.

The main bottleneck for the compressed domain decoder is the inverse motion compensation function. As described in Eq (8) above, full-pixel inverse motion compensation in the compressed domain requires a sum of four ($TM_i$) terms, where $TM_i$ is defined as pre- and post-multiplying the 8×8 matrix block $F'_i$ with transform matrix $C_{ij}$.

$$F_k = TM_1 + TM_2 + TM_3 + TM_4 \tag{10}$$

$$\text{where } TM_i = C_{i1} F'_i C_{i2} \tag{11}$$

Table 4 defines the full-pixel transform matrices $C_{ij}$. Here, S represent the 8×8 DCT matrices, and $U_k$ and $L_k$ are defined in Equations 3-6 above.

TABLE 4

| Full-pixel transform matrix | Matrix definition |
|---|---|
| $C_{11} = C_{21}$ | $SU_h S'$ |
| $C_{31} = C_{41}$ | $SL_{8-h} S'$ |
| $C_{12} = C_{32}$ | $SL_w S'$ |
| $C_{22} = C_{42}$ | $SU_{8-w} S'$ |

Each 8×8 matrix multiplication requires 512 multiplies and 448 additions. As is known matrix multiplication is computationally expensive. Table 5 compares the optimization schemes, such as matrix approximation, matrix factorization, sharedblock for macroblocks, and a hybrid scheme for a compressed domain video pipeline such as the pipeline with reference to FIGS. 2, 6B and 15. The compressed domain video decoding pipeline should decode at a rate of about 15-25 frames per second (fps) in order to provide acceptable quality for handheld devices that support video formats such as the common intermediate format where each frame of data contains 352 lines with 288 pixels per line.

TABLE 5

| Optimization | Decode Time (s) | # Frames | FPS | Comments |
|---|---|---|---|---|
| Spatial domain | 9.79 | 144 | 14.71 | Original TELENOR H.263 video decoder. |
| Matrix-matrix | 14.17 | 144 | 10.16 | Full 8 × 8 matrix multiplications for TM. |
| Approximation | 9.82 | 144 | 14.66 | Good time but poor PSNR. |
| Factorization | 12.95 | 144 | 11.12 | Good PSNR but poor time. |
| Sharedblock | 14.85 | 144 | 9.70 | No improvement here. |
| Hybrid | 9.83 | 144 | 14.65 | Good time and good PSNR. |

Figure 13:
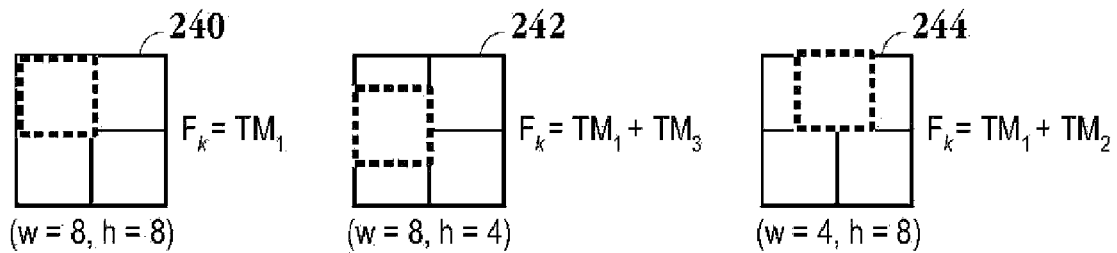
FIG. 13 is a schematic diagram illustrating three examples of block alignment to reduce matrix multiplication.

One enhancement to a compressed domain video decoding pipeline is to reduce the number of $TM_i$ operations in Eq (10) by block alignment. For example, to decode 144 frames of a sequence and measure block alignment rates at 36.7% of all blocks. FIG. 13 is a schematic diagram illustrating three examples of block alignment to reduce matrix multiplication. Block alignment case 240 where (w=8,h=4), block alignment case 242 where (w=4,h=8), and block alignment case 244 where (w=8,h=8) are each illustrated. In each of these examples 240, 242, and 244, $TM_i$ operations are eliminated when the overlap with a corresponding block is zero. However, it should be appreciated that, in the DCT domain (compressed domain), block alignment does not yield savings when half-pixel interpolation is specified. The equations for half-pixel inverse motion compensation in the compressed domain are given below. For the example of (w=8,h=8), half-pixel interpolation still requires four $TM_i$ operations as illustrated in equations 12 and 13. Table 6 is provided for informational purposes to define the half pixel transform matrices $C_{hpij}$.

$$F_{hpk} = TM_{hp1} + TM_{hp2} + TM_{hp3} + TM_{hp4} \tag{12}$$

$$TM_{hpi} = C_{hpi1} F'_i C_{hpi2} \tag{13}$$

TABLE 6

| Half-pixel transform matrix | Horizontal interpolation | Vertical interpolation | Horizontal & vertical |
|---|---|---|---|
| $C_{hp11} = C_{hp21}$ | $SU_h S'$ | $S(U_h + U_{h+1})S'$ | $S(U_h + U_{h+1})S'$ |
| $C_{hp31} = C_{hp41}$ | $SL_{8-h}S'$ | $S(L_{8-h} + L_{9-h})S'$ | $S(L_{8-h} + L_{9-h})S'$ |
| $C_{hp12} = C_{hp32}$ | $S(L_w + L_{w+1})S'$ | $SL_w S'$ | $S(L_w + L_{w+1})S'$ |
| $C_{hp22} = C_{hp42}$ | $S(U_{8-w} + U_{9-w})S'$ | $SU_{8-w}S'$ | $S(U_{8-w} + U_{9-w})S'$ |

Figure 14:
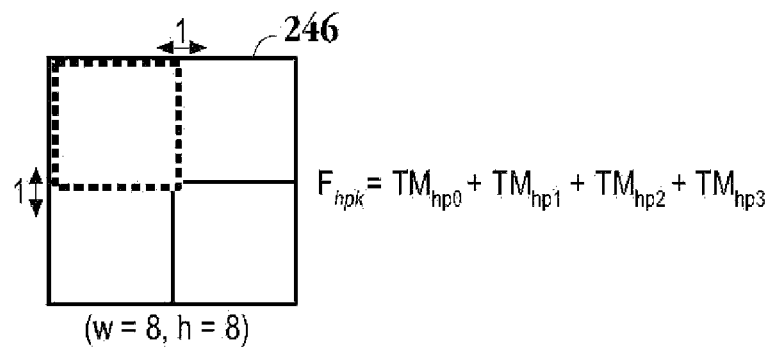
FIG. 14 is a schematic diagram of a half pixel interpolation for a perfectly aligned DCT block.

It should be noted that even for a perfectly aligned DCT block, half-pixel interpolation creates an overlap of one with the neighboring blocks. FIG. 14 is a schematic diagram of a half pixel interpolation for a perfectly aligned DCT block. The half pixel interpolation creates overlapping into neighboring blocks by one pixel width and one pixel height.

Increasing the speed of processing in the compressed domain decoding pipeline may be accomplished by rearrangement of the functional blocks of the decoder of FIG. 2. With reference to Tables 2 and 3, the processing time for the inverse DCT block is much less in the spatial domain (3 ms) than in the compressed domain (652 ms). In the spatial domain, inverse DCT is applied before the feedback loop to the intrablocks and the error coefficients. In particular, the intrablocks and error coefficients make up less than 15% of all the blocks in the video. The other 85% of the time the inverse DCT function is simply skipped. In the compressed domain, inverse DCT is applied at the last stage of the pipeline to 100% of the blocks in each frame of the video.

Figure 15:
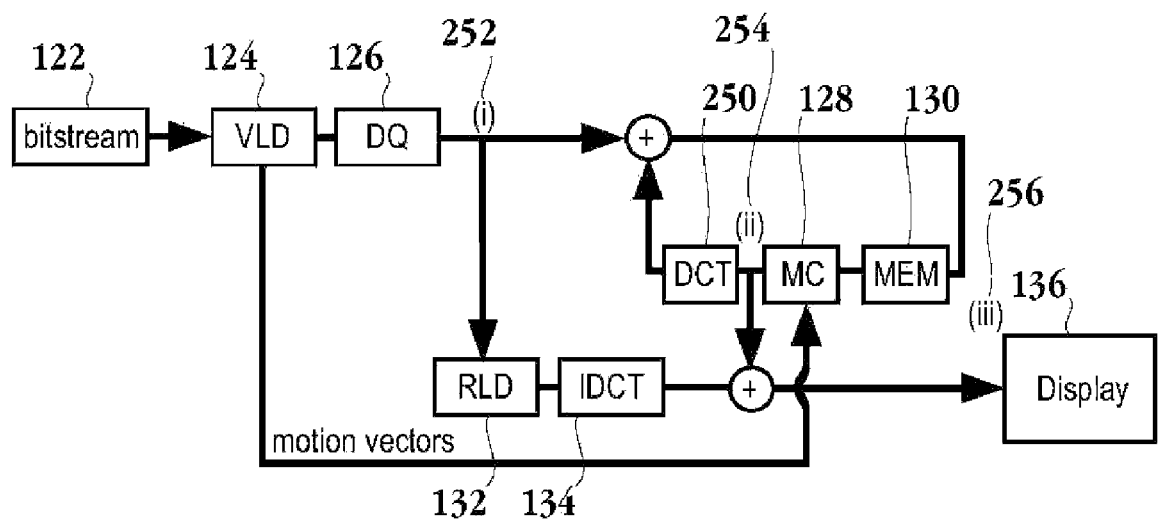
FIG. 15 is a schematic diagram illustrating the rearrangement of the functional blocks of a compressed domain video decoder to enhance the processing of the video data in accordance with one embodiment of the invention.

FIG. 15 is a schematic diagram illustrating the rearrangement of the functional blocks of a compressed domain video decoder to enhance the processing of the video data in accordance with one embodiment of the invention. Here, the functional blocks are rearranged and the compressed domain pipeline is split at two points. The first split occurs after VLD 124 and DQ 126 at point (i) 252. In the upper branch, the pipeline keeps an internal DCT domain representation for memory compression 128. In the lower branch, the pipeline moves the RLD and IDCT up to the front to decode the error coefficients into the spatial domain. The second split occurs during motion compensation (MC) at point (ii) 254. During motion compensation, a spatial domain output may be generated according to equation (7). The output can be directly added to the error coefficients to reconstruct the current block at point (iii) 256 to be presented on display 136. DCT block 250 is inserted in the feedback loop to maintain the internal DCT representation. The combination of RLD 132 and IDCT 134 at point (i) 252 and the DCT at point (ii) 254 requires less computation than the IDCT block at the last stage of the pipeline in FIG. 2. Table 7 shows that the rearrangement with reference to FIG. 15 generates a 20% speedup that can be combined in addition to other optimization schemes described herein.

TABLE 7

| Function | Percentage of Blocks | Comments |
|---|---|---|
| IDCT in FIG. 15 point (i) | 15% | Intrablocks and error coefficients represent small fraction of all blocks. |
| DCT in FIG. 15 point (ii) | 63% | Non-aligned blocks require DCT, but aligned blocks are directly copied without DCT. |
| IDCT in FIG. 2 | 100% | Applied to all blocks in DCT domain. |

In one embodiment, the inverse motion compensation is accelerated by reducing the number of multiplies required by the basic TM operation in Eqs. (11,13). Instead of calculating full 8×8 matrix multiplications, the DCT matrix S is factored into a sequence of sparse matrices as illustrated in Eq. 14. The sparse matrices in Eq. (17) include permutation matrices ($A_1$, $A_2, A_3, A_4, A_5, A_6$) and diagonal matrices (D,M). Substituting this factorization into Eq. (15), we derive a fully factored expression for $TM_i$ in Eq. (16), which requires less multiplies than the original Eqs. (11,13).

$$S = DA_1 A_2 A_3 MA_4 A_5 A_6 \tag{14}$$

$$TM_i = Sc_{i1} S' F'_i Sc_{i2} S' \tag{15}$$

$$TM_i = (DA_1 A_2 A_3 MA_4 A_5 A_6) c_{i1} (DA_1 A_2 A_3 MA_4 A_5 A_6)^t \tag{16}$$
$$F'_i (DA_1 A_2 A_3 MA_4 A_5 A_6) c_{i2} (DA_1 A_2 A_3 MA_4 A_5 A_6)^t$$

$$D = \begin{bmatrix} s_0 & & & & & & & \\ & s_1 & & & & & & \\ & & s_2 & & & & & \\ & & & s_3 & & & & \\ & & & & s_4 & & & \\ & & & & & s_5 & & \\ & & & & & & s_6 & \\ & & & & & & & s_7 \end{bmatrix} \tag{17}$$

$$A_1 = \begin{bmatrix} 1 & & & & & & & \\ & & & & 1 & & & \\ & & 1 & & & & & \\ & & & & & & 1 & \\ & 1 & & & & & & \\ & & & & & 1 & & \\ & & & 1 & & & & \\ & & & & & & & 1 \end{bmatrix}$$

$$A_2 = \begin{bmatrix} 1 & & & & & & & \\ & 1 & & & & & & \\ & & 1 & & & & & \\ & & & 1 & & & & \\ & & & & 1 & & 1 & \\ & & & & & 1 & 1 & \\ & & & & & 1 & -1 & \\ & & & & -1 & & & 1 \end{bmatrix} \quad (17)$$

$$A_3 = \begin{bmatrix} 1 & & & & & & & \\ & 1 & & & & & & \\ & & 1 & 1 & & & & \\ & & -1 & 1 & & & & \\ & & & & 1 & & & \\ & & & & & 1 & 1 & \\ & & & & & & 1 & \\ & & & & & -1 & & 1 \end{bmatrix}$$

$$M = \begin{bmatrix} & & & & & & & \\ & A & & & & & & \\ & & & & & & & \\ & & & -B & & -C & & \\ & & & & A & & & \\ & & & -C & & B & & \\ & & & & & & & 1 \end{bmatrix}$$

$$A_4 = \begin{bmatrix} 1 & 1 & & & & & & \\ 1 & -1 & & & & & & \\ & & 1 & 1 & & & & \\ & & & 1 & & & & \\ & & & & 1 & & & \\ & & & & & 1 & & \\ & & & & & & 1 & \\ & & & & & & & 1 \end{bmatrix}$$

$$A_5 = \begin{bmatrix} 1 & & & 1 & & & & \\ & 1 & 1 & & & & & \\ & 1 & -1 & & & & & \\ 1 & & & -1 & & & & \\ & & & & -1 & -1 & & \\ & & & & & & 1 & 1 \\ & & & & & & 1 & 1 \\ & & & & & & & 1 \end{bmatrix} \quad (17)$$

$$A_6 = \begin{bmatrix} 1 & & & & & & & 1 \\ & 1 & & & & & 1 & \\ & & 1 & & & 1 & & \\ & & & 1 & 1 & & & \\ & & & 1 & -1 & & & \\ & & 1 & & & -1 & & \\ & 1 & & & & & -1 & \\ 1 & & & & & & & -1 \end{bmatrix}$$

$$D = \text{diag}\{0.3536, 0.2549, 0.2706, 0.3007, 0.3536, 0.4500, 0.6533, 1.2814\} \quad (18)$$

$$A = 0.7071, B = 0.9239, C = 0.3827 \quad (19)$$

Thus, the matrix multiplication is replaced with matrix permutation. However, a fully factored expression for the term $TM_i$, as shown in Eq. (16), does not necessarily speed up inverse motion compensation. In essence, multiplies have been traded for memory accesses, and too many memory accesses can actually slow down the decoding process. Therefore, the matrices are regrouped to strike a balance between these competing functionalities. Matrix $S$ ($=G_0G_1$) is factored into two terms: $G_0=DA_1A_2A_3$, mixture of permutations and multiplications; and $G_1=MA_4A_5A_6$, mixture of permutations and additions. The fixed matrices $J_i$, $K_i$ are defined and substituted into Eqs. (10 and 12) to form a factored expression for inverse motion compensation in Eq. (24):

$$J_h = c_{11}G_1^t = c_{21}G_1^t, \quad J_w = G_1c_{12} = G_1c_{32} \quad (20)$$

$$K_h = c_{31}G_1^t = c_{41}G_1^t, \quad K_w = G_1c_{22} = G_1c_{42} \quad (21)$$

Similarly for half-pixel interpolation:

$$J_h = c_{hp11}G_1^t = c_{hp21}G_1^t, \quad J_w = G_1c_{hp12} = G_1c_{hp32} \quad (22)$$

$$K_h = c_{hp31}G_1^t = c_{hp41}G_1^t, \quad K_w = G_1c_{hp22} = G_1c_{hp42} \quad (23)$$

$$F_k = S[J_hG_0^tF'_1G_0J_w + J_hG_0^tF'_2G_0K_w + K_hG_0^tF'_3G_0J_w + K_hG_0^tF'_4G_0K_w]S^t \quad (24)$$

Further speed enhancement may be obtained by implementing fast multiplication by the fixed matrices $J_i$, $K_i$. The fixed matrices contain repeated structures. For example, the matrix $J6$ is defined as follows $$J_6 = \begin{bmatrix} 1 & -1 & -a & 0 & b & a & c & 0 \\ 1 & 1 & -a & -1 & b & 0 & c & 0 \\ 1 & 1 & -a & -1 & -b & 0 & -c & 0 \\ 1 & -1 & -a & 0 & -b & -a & -c & 0 \\ 1 & -1 & a & 0 & c & -a & -b & 0 \\ 1 & 1 & a & 1 & c & 0 & -b & -1 \\ 0 & 0 & 0 & 0 & 0 & 0 & 0 & 0 \\ 0 & 0 & 0 & 0 & 0 & 0 & 0 & 0 \end{bmatrix}$$

where $a=0.7071$, $b=0.9239$, and $c=0.3827$. To compute $u=J_{6v}$, where $u=\{U_1, \ldots, u_8\}$ and $u=\{v_1, \ldots, v_8\}$, a sequence of equations is calculated according to the following steps:

$$y_1 = v_1 + v_2 \quad (25)$$

$$y_2 = v_1 - v_2 \quad (26)$$

$$y_3 = av_3 \quad (27)$$

$$y_4 = av_6 \quad (28)$$

$$y_5 = y_1 - y_3 \quad (29)$$

$$y_6 = y_5 - y_4 \quad (30)$$

$$y_7 = y_3 - y_4 \quad (31)$$

$$y_8 = y_3 + y_4 \quad (32)$$

$$y_9 = (b+c)(v_5 + v_7) \quad (33)$$

$$y_{10} = cv_5 \quad (34)$$

$$y_{11} = bv_7 \quad (35)$$

$$y_{12} = y_9 - y_{10} - y_{11} \quad (36)$$

$$y_{13} = y_{10} - y_{11} \quad (37)$$

$$u_1 = y_2 - y_7 + y_{12} \quad (38)$$

$$u_2 = y_6 + y_{12} \quad (39)$$

$$u_3 = y_6 - y_{12} \quad (40)$$

$$u_4 = y_2 - y_8 - y_{12} \quad (41)$$

$$u_5 = y_2 + y_7 + y_{13} \quad (42)$$

$$u_6 = y_1 + y_3 + u_4 + y_{13} - u_8 \quad (43)$$

$$u_7 = 0 \quad (44)$$

$$u_8 = 0 \quad (45)$$

Accordingly, the matrix-vector multiplication has been transformed into a sequence of equations. The above sequence of equations requires 5 multiplications and 21 additions. The matrix multiplication $J_h G_0 \text{'F'}$ in Eq. (24) requires 104 multiplications and 164 additions. Thus, a 5 time reduction over the number of multiplies needed for matrix multiplication $C_{i1}\text{F'}$ in Eq. (8) is achieved here. Additionally, no precision is lost during this matrix operation, which uses 32-bit floating point arithmetic. However, with reference to Table 5, factorization speeds up the compressed domain pipeline by only 9% over matrix-matrix. Consequently, the extra memory accesses slow the frame rate to below the target rate of about 15 to about 25 fps so that factorization alone will not suffice.

To further speedup the inverse motion compensation the multiplies required by the basic TM operation in Eqs. (11,13) are eliminated. The full-pixel and half-pixel matrices $C_{ij}$ and $C_{hpij}$ are approximated to binary numbers to the nearest power of $2^{-5}$. By approximating these matrices with binary numbers, matrix multiplication can be performed by using basic integer operations, such as right-shift and add, to solve inverse motion compensation in Eqs. (10,12). For example, the full-pixel matrix $C_{11}$ where h=i is examined below. It should be appreciated that the other matrices are approximated in a similar fashion.

$$C_{11} = \begin{bmatrix} 0.12501651 & -0.17338332 & 0.16332089 & \ldots & -0.03447659 \\ 0.17340284 & -0.24048958 & 0.22653259 & \ldots & -0.04782041 \\ 0.16334190 & -0.22653624 & 0.21338904 & \ldots & -0.04504584 \\ \vdots & \vdots & \vdots & \ddots & \vdots \\ 0.03449197 & -0.04783635 & 0.04506013 & \ldots & -0.00951207 \end{bmatrix} \quad (46)$$

Where each element in the matrix is rounded to the nearest powers of 2, matrix (47) results:

$$\hat{C}_{11} = \begin{bmatrix} 0.1250 & -0.1875 & 0.1875 & \ldots & -0.0625 \\ 0.1875 & -0.2500 & 0.2500 & \ldots & -0.0625 \\ 0.1875 & -0.2500 & 0.1875 & \ldots & -0.0625 \\ \vdots & \vdots & \vdots & \ddots & \vdots \\ 0.0625 & -0.0625 & 0.0625 & \ldots & 0 \end{bmatrix} \quad (47)$$

Since the DCT elements lie in the range of [−2048 to 2047], direct shifting of the DCT coefficients would drive most of the values to zero. In order to maintain precision in the intermediate results, we scale each DCT coefficient by $2^8$ throughout the decoding pipeline. This scaling factor is introduced during the quantization and dequantization steps so that no extra operations are incurred.

Furthermore, we implement fast matrix multiplication by grouping terms according to the sum of products rule (see Eqs. (48-50)).

$$u_1 = 0.1250 v_1 - 0.1875 v_2 + 0.1875 v_3 - \\ 0.1250 v_4 + 0.1250 v_5 - 0.1250 v_6 + 0.0625 v_7 - 0.0625 v_8 \quad (48)$$

$$u_1 = (v_1 >> 3) - (v_2 >> 3) - (v_2 >> 4) + (v_3 >> 3) + (v_3 >> 4) - \\ (v_4 >> 3) + (v_5 >> 3) - (v_6 >> 3) + (v_7 >> 4) - (v_8 >> 4) \quad (49)$$

$$u_1 = (v_1 - v_2 + v_3 - v_4 + v_5 - v_6) >> 3 + (-v_2 + v_3 + v_7 - v_8) >> 4 \quad (50)$$

The computation for $u = \hat{C}_{11} v$, where $u = \{u_1, \ldots, u_8\}$ and $v = \{v_1, \ldots, v_8\}$, may be calculated as:

$$u_1 = (v_1 - v_2 + v_3 - v_4 + v_5 - v_6) >> 3 + (-v_2 + v_3 + v_7 - v_8) >> 4 \quad (51)$$

$$u_2 = (v_3 - v_2) >> 2 + (v_1 - v_4 + v_5 - v_6 + v_7) >> \\ 3 + (v_1 - v_4 + v_5 - v_8) >> 4 \quad (52)$$

$$u_3 = (v_1 + v_3 - v_4 + v_5 - v_6) >> \\ 3 - (v_2 >> 2) + (v_1 + v_3 - v_4 + v_5 + v_7 - v_8) >> 4 \quad (53)$$

$$u_4 = (v_1 - v_2 + v_3 - v_4 + v_5 - v_6) >> 3 + (v_3 - v_2 - v_4 + v_7 - v_8) >> 4 \quad (54)$$

$$u_5 = (v_1 - v_2 + v_3 - v_4 + v_5 - v_6) >> 3 + (-v_2 + v_3 + v_7 - v_8) >> 4 \quad (55)$$

$$u_6 = (v_1 - v_2 + v_3 - v_4 + v_5) >> 3 + (v_7 - v_6) >> 4 \quad (56)$$

$$u_7 = (v_1 + v_3 - v_4 + v_5 - v_6 + v_7) >> 4 + (v_2) >> 3 \quad (57)$$

$$u_8 = (v_1 - v_2 + v_3 - v_4 + v_5) >> 4 \quad (58)$$

The matrix approximation requires a total of 17 right-shifts and 57 adds. The matrix approximation $\hat{C}_{i1}\text{F'}$ in Eq. (8) requires 136 right-shifts and 456 adds. Accordingly, a significant reduction in complexity over matrix multiplication is achieved with floating point precision. In fact, Table 5 shows that approximation techniques speed up the compressed domain pipeline by 31%, which is enough to achieve the target frame rate of about 15 fps. However, the PSNR for a sample video decreases and shows noticeable drift in areas of moderate motion.

A hybrid factorization/integer approximation for the transform matrix TM that is selectively applied based upon the video motion provides the desired frame rate of between about 15 and about 25 fps, while maintaining acceptable quality. As mentioned above, the integer approximation technique reduces the complexity of the decoder but also reduces the PSNR of the decoded video. At the same time, the factorization method maintains good PSNR but does not reduce the complexity of the decoder to meet the desired frame rate. Through the integration of the low complexity of the integer approximation with the high precision of the factorization method a compressed domain video decoding pipeline for supporting a low rate video bit stream is obtained.

Two types of transform matrices have been discussed herein: $TM_i$, full pixel motion compensation illustrated in Eq. (11); and $TM_{hpi}$, half pixel motion compensation illustrated in Eq. (13). Full pixel motion compensation, using approximate matrices for $TM_i$, has only 28% of the computational complexity compared to that of using 8×8 floating point matrices. However, when applying the approximation techniques directly on the half pixel transform matrices, $TM_{hpi}$, it has been observed that half pixel motion compensation, using approximate matrices for $TM_{hpi}$, lowers the PSNR (see Table 8) and creates visible distortions in the decoded video. The errors are generated from two sources. First, the half pixel transform matrices $TM_{hpi}$ are more sensitive to approximation techniques. With reference to Table 8, $TM_{hpi}$ are composite matrices, composed of many more terms than $TM_i$. Secondly, as described above with reference to FIGS. 6A and 6B, the nonlinear processing during half pixel interpolation, combined with the errors generated by the approximation techniques, lead to an accumulation of errors that are especially visible in regions of moderate to high motion.

The selective application of the factorization method to the half pixel matrices addresses these errors. As discussed above, the factorization method maintains floating point precision so that the errors described can be minimized. For example, the factorization method reduces the matrix multiplication with $TM_{hpi}$ into a sequence of equations similar to those described in Eqs. (25-45). These equations maintain 32-bit floating point precision so that no approximation errors are generated. Furthermore, the factorization methods decode the DCT block into the spatial domain during motion compensation so that the optimizations described with reference to FIG. 15 may be combined with those described here. Table 5 shows that the hybrid method meets our target frame rate of 15 fps, while Table 8 illustrates that the PNSR of the hybrid method provides an acceptable PSNR.

TABLE 8

| Video (128 kbps, QCIF, 15 fps) | Compressed Domain w/Factor TM (PSNR_Y) | Compressed Domain w/Hybrid TM (PSNR_Y) | Compressed Domain w/Approximate TM (PSNR_Y) |
| --- | --- | --- | --- |
| Sample A | 25.53 | 25.53 | 22.65 |
| Sample B | 22.47 | 19.57 | 18.75 |
| Sample C | 30.79 | 30.66 | 29.90 |
| Sample D | 33.29 | 33.25 | 28.93 |
| Sample E | 31.27 | 31.10 | 28.89 |

Figure 16:
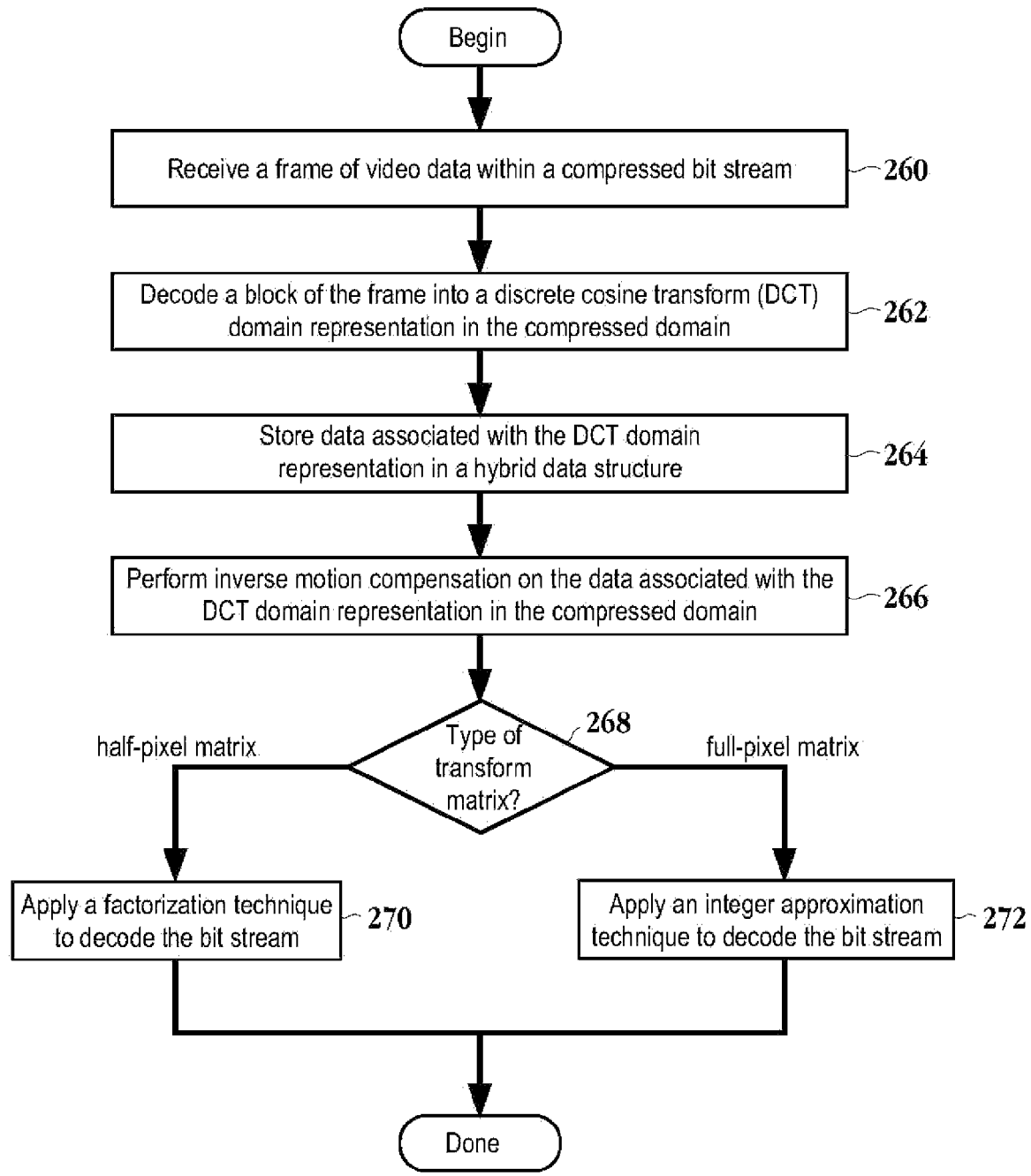
FIG. 16 is a flowchart diagram of the method operations for performing inverse motion compensation in the compressed domain in accordance with one embodiment of the invention.

FIG. 16 is a flowchart diagram of the method operations for performing inverse motion compensation in the compressed domain in accordance with one embodiment of the invention. The method initiates with operation 260 where a frame of video data within a compressed bit stream is received. In one embodiment, the bit stream is a low rate bit stream. For example, the bit stream may be associated with a known video coding standard, such as MPEG 4, H.263, H.261, etc. The method then advances to operation 262 where a block of the frame of the bit stream is decoded into a discrete cosine transform (DCT) domain representation. Here, the video is processed through the first two stages of a decoder such as the decoder of FIGS. 2, 6B and 15. That is, the video data is processed through the variable length decoder stage and the dequantization stage to decode the compressed bit stream into a DCT domain representation. It should be appreciated that the DCT domain representation is in a compressed state format. The method then proceeds to operation 264 where the data associated with the DCT domain representation is stored in a hybrid data structure. A suitable hybrid data structure is the hybrid data structure discussed with reference to FIGS. 10 and 12. In one embodiment, the hybrid data structure reduces the memory requirements for a portable electronic device, e.g., cellular phone, PDA, web tablet, pocket personal computer, etc., having a display screen for presenting the video data.

Still referring to FIG. 16, the method moves to operation 266 where inverse motion compensation is performed on the data associated with the DCT domain representation in the compressed domain. Here, the inverse motion compensation includes selectively applying a hybrid factorization/integer approximation technique described above with reference to Tables 5 and 8. The method then advances to decision operation 268 where the hybrid factorization/integer approximation identifies a type of transform matrix associated with the block of video data being processed. In one embodiment, the type of transform matrix is detected through information in a bit set of the bit stream being decoded. If the transform matrix is a half pixel matrix then the method proceeds to operation 270 where a factorization technique is applied to decode the bit stream. In one embodiment, the factorization technique reduces matrix multiplication into a series of equations as described above with reference to equation 25-45. That is, matrix multiplication is replaced with matrix permutation. If the transform matrix is determined to be a full pixel matrix in decision operation 268, then the method advances to operation 272 where an integer approximation technique is applied to decode the bit stream. Here, the matrix multiplication may be performed by using basic integer operations to solve inverse motion compensation as discussed above with reference to equations 46-58. Thus, through the selective application of the hybrid factorization/integer approximation technique, processing in the compressed domain is performed to provide a sufficient frame rate with acceptable quality to enable the reduction in memory achieved through the hybrid data structure discussed above.

Figure 17:
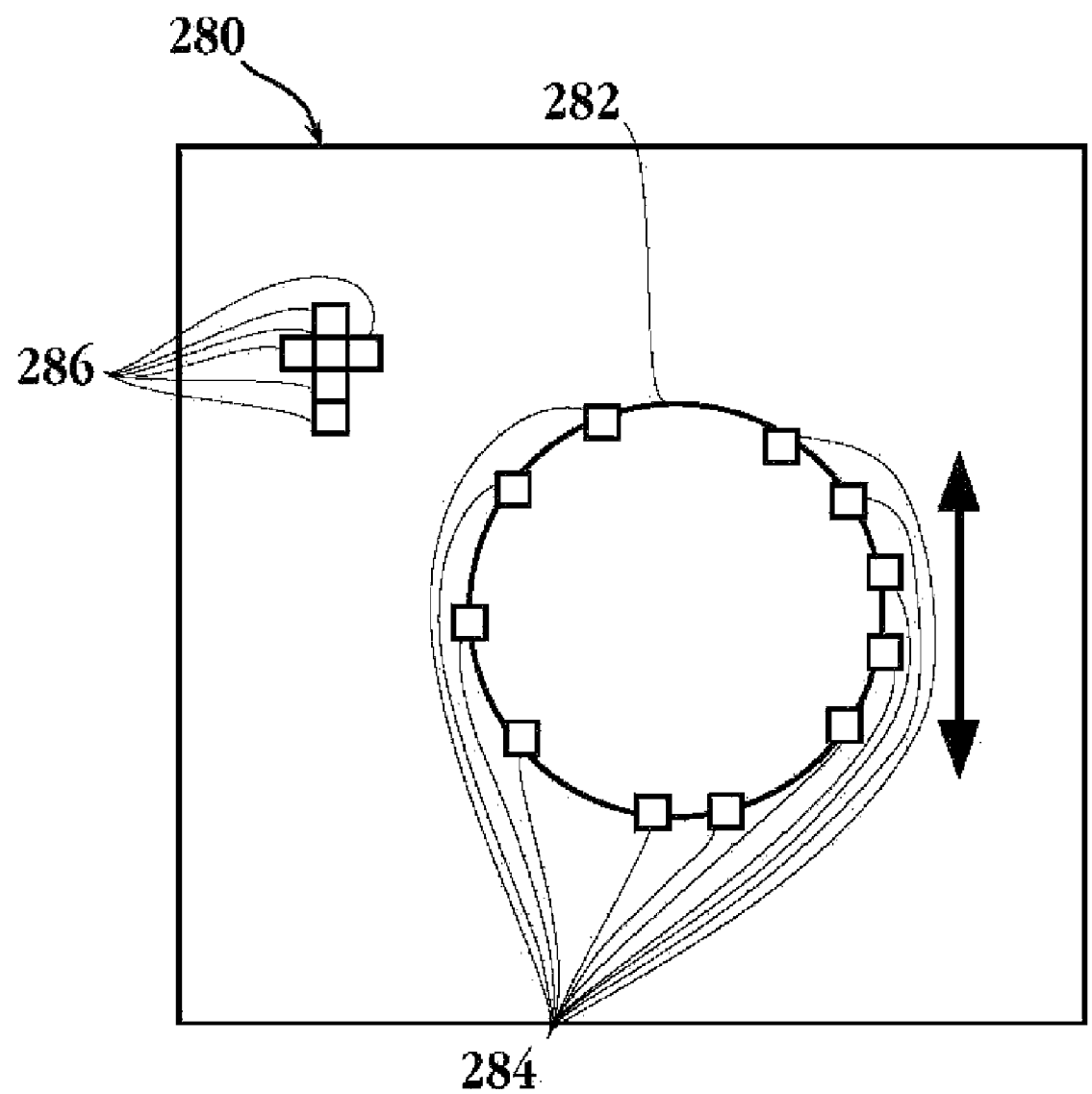
FIG. 17 is a schematic diagram of the selective application of the hybrid factorization/integer approximation technique in accordance with one embodiment of the invention.

FIG. 17 is a schematic diagram of the selective application of the hybrid factorization/integer approximation technique in accordance with one embodiment of the invention. Display screen 280 is configured to present images defined by low bit rate video. For example, display screen 280 may be associated with a portable electronic device e.g., a PDA, cellular phone, pocket personal computer, web tablet, etc. Ball 282 is moving in a vertical direction in the video. Blocks 284 are located around the perimeter of the moving object and are considered high or moderate motion areas and change from frame to frame. Blocks 286 represent the background and remain substantially the same from frame to frame. Thus, during the decoding of the compressed bit stream blocks 284 of a frame of data will be associated with high motion areas, from frame to frame, while blocks 286 remain substantially the same from frame to frame. Blocks 284 which are associated with the high motion areas, require higher precision during decoding techniques, i.e., factorization, while blocks 286 remain substantially the same and can tolerate a lower complexity interpolation method, i.e., integer approximation. Therefore, the factorization technique is applied to the high and moderate motion area blocks 284 and the integer approximation is applied to background blocks 286. As mentioned above, information embedded in the bit stream is detected to determine whether a block is associated with high motion, i.e., half pixel motion compensation is applied through factorization, or if the block is background data, i.e., full pixel motion compensation is applied through integer approximation. In one embodiment, the motion vectors with reference to FIGS. 2, 6B, and 15 specify whether the motion compensation is half pixel or full pixel motion compensation.

It should be appreciated that the above described embodiments may be implemented in software or hardware. One skilled in the art will appreciate that the decoder can be embodied as a semiconductor chip that includes logic gates configured to provide the functionality discussed above. For example, a hardware description language (HDL), e.g., VERILOG, can be employed to synthesize the firmware and the layout of the logic gates for providing the necessary functionality described herein to provide a hardware implementation of the video decoder.

Figure 18:
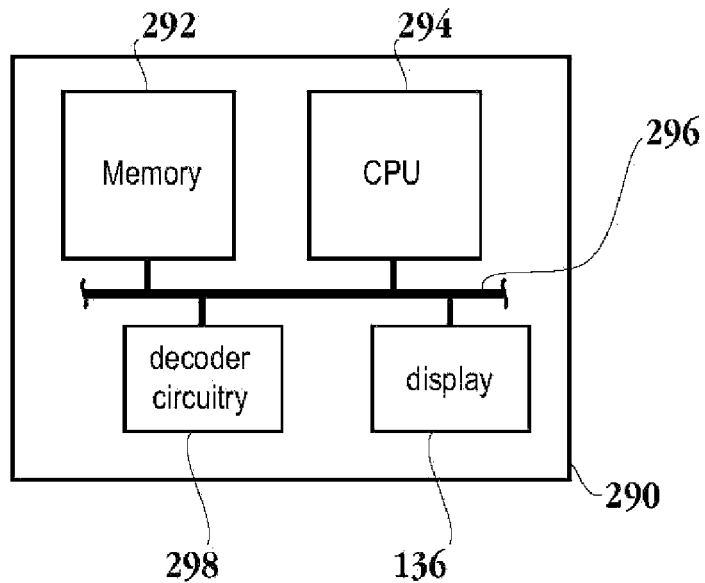
FIG. 18 is a simplified schematic diagram of a portable electronic device having decoder circuitry configured to utilize hybrid data structures to minimize memory requirements and to apply a hybrid factorization/integer approximation technique to efficiently decode the bit stream data in accordance with one embodiment of the invention.

FIG. 18 is a simplified schematic diagram of a portable electronic device having decoder circuitry configured to utilize hybrid data structures to minimize memory requirements and to apply a hybrid factorization/integer approximation technique to efficiently decode the bit stream data in accordance with one embodiment of the invention. Portable electronic device 290 includes central processing unit (CPU) 294, memory 292, display screen 136 and decoder circuitry 298, all in communication with each other over bus 296. Decoder circuitry 298 includes logic gates configured to provide the functionality to reduce memory requirements for the video processing and performing inverse motion compensation in the compressed domain as described above. It will be apparent to one skilled in the art that decoder circuitry 298 may include memory on a chip containing the decoder circuitry or the memory may be located off-chip.

Figure 19:
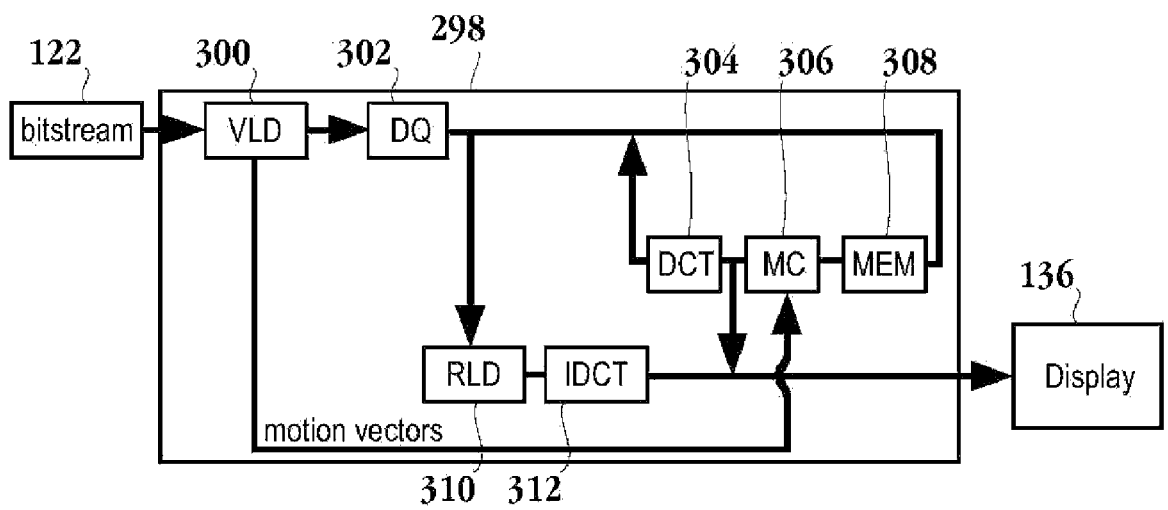
FIG. 19 is a more detailed schematic diagram of the decoder circuitry of FIG. 18 in accordance with one embodiment of the invention.

FIG. 19 is a more detailed schematic diagram of the decoder circuitry of FIG. 18 in accordance with one embodiment of the invention. Incoming bit stream 122 is received by variable length decoder (VLD) circuitry 300 of decoder 298. One skilled in the art will appreciate that decoder circuitry 298 may be placed on a semiconductor chip disposed on a printed circuit board. VLD circuitry 300 is in communication with dequantization circuitry 302. VLD circuitry 300 provides motion vector signals to motion compensation circuitry 306. Video processing memory 308 stores an internal representation of the video from dequantization circuitry 302 that is in the compressed domain. DCT circuitry 304 maintains the internal DCT representation of the video from motion compensation circuitry 306. Run length decode (RLD) circuitry 310 and inverse discrete cosine transform (IDCT) circuitry 312 decompress the video data for presentation on display screen 136. It should be appreciated that the circuitry blocks described herein provide the similar functionality to the blocks/stages described with reference to FIGS. 2, 6B and 15.

In summary, the above described invention provides a compressed domain video decoder that reduces the amount of video memory and performs inverse motion compensation in the compressed domain. Memory reduction is achieved by hybrid data structures configured to store and manipulate non-zero DCT coefficients of the reference frame to define a current frame. The hybrid data structure includes a fixed size array having fixed size blocks associated with each block of a frame of video data. A variable size overflow vector is included in the hybrid data structure to accommodate non-zero coefficients in excess of the capacity of the fixed size blocks. The amount of memory compression achieved through the compressed domain video decoder is up to two times as compared to a spatial domain video decoder. The inverse motion compensation for the compressed domain video decoder has been optimized to provide about 15-25 frames per second of acceptable quality video. A hybrid factorization/integer approximation is selectively applied to blocks being decoded. The criteria for determining which interpolation of the factorization/integer approximation technique to apply is based upon the transform matrix, i.e., factorization is applied to half pixel matrices, while integer approximation is applied to full pixel matrices. It should be appreciated that the compressed domain pipeline described herein may be incorporated into an MPEG-4 simple profile video decoder in one embodiment. Furthermore, the embodiments enable a variety of applications to be pursued, e.g., power-scalable decoding on battery-operated (CPU constrained) devices and compositing for video conferencing systems.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer readable media having program instructions for reducing the memory requirements for decoding a video bit stream, the program instructions comprising instructions for:
    decoding a frame of the bit stream into a transform domain representation that comprises a first group of blocks, each storing a plurality of coefficients of the transform domain representation, at least some of the plurality of coefficients being non-zero coefficients;
    assembling a hybrid data structure including a fixed size array comprising a second group of blocks, each associated with a respective one of the blocks in the first group of blocks, and a variable size overflow vector associated with the frame; and
    inserting the non-zero coefficients of the transform domain representation into the hybrid data structure, wherein each block of the second group of blocks stores at least some non-zero coefficients from the corresponding block of the first group of blocks and the variable size overflow vector stores the remaining non-zero coefficients from the corresponding block.

2. The computer readable media of claim 1, wherein the video bit stream is a low rate video bit stream.

3. The computer readable media of claim 1, wherein the instruction of decoding a frame of the bit stream into a transform domain representation includes instruction for,
    processing the bit stream through a variable length decoder and a dequantization block.

4. The computer readable media of claim 1, wherein each block of the fixed size array is a fixed size block.

5. The computer readable media of claim 4 wherein each of the fixed size blocks is configured to store 8 non-zero coefficients of the transform domain representation.

6. A computer readable media having program instructions for decoding a frame of video data within a compressed bit stream, the program instructions comprising instructions for:
- decoding the frame into a transform domain representation that comprises a first group of blocks, each storing a plurality of coefficients of the transform domain representation, at least some of the plurality of coefficients being non-zero coefficients;
- defining a hybrid data structure comprising a second group of blocks, each associated with a respective one of the blocks in the first group of blocks, and a variable size overflow vector associated with the frame;
- storing data associated with the transform domain representation in the hybrid data structure, such that non-zero coefficients from a particular block of the first group of blocks are stored in the associated block of the second group of blocks until a capacity of the associated block is reached, and then any remaining non-zero coefficients from the particular block are stored in the variable size overflow vector;
- performing inverse motion compensation on the data associated with the transform domain representation in the compressed domain; and
- after performing the inverse motion compensation on the data, decompressing the data for display.

7. The computer readable media of claim 6, wherein the second group of blocks defines a fixed size array with each block thereof being a fixed size.

8. The computer readable media of claim 6, wherein the compressed bit stream is a low rate bit stream.

9. The computer readable media of claim 6, wherein the instruction of performing inverse motion compensation on the data associated with the transform domain representation in the compressed domain includes instruction for,
- applying a hybrid factorization and integer approximation technique to the data associated with the transform domain representation.

10. A computer readable media having program instructions for rearranging low rate bit stream data for storage into a hybrid data structure, comprising:
- program instructions for identifying non-zero transform coefficients associated with a coded block of a frame of data;
- program instructions for arranging the non-zero transform coefficients into a fixed size array;
- program instructions for determining if a quantity of the non-zero transform coefficients exceed a capacity of the fixed size array;
- program instructions for storing the non-zero transform coefficients exceeding the capacity of the fixed size array in a variable size overflow vector; and
- program instructions for translating the non-zero transform coefficients from a compressed domain to a spatial domain.

11. The computer readable media of claim 10, wherein the fixed size array includes a plurality of fixed size blocks.

12. The computer readable media of claim 11, wherein each of the fixed size blocks are configured to store a maximum of eight non-zero transform coefficients.

13. The computer readable media of claim 10, further including:
- program instructions for mapping coefficients in the fixed size array to corresponding coefficients in the variable size overflow vector for each block of the frame of data.

14. The computer readable media of claim 10, further including:
- program instructions for performing inverse motion compensation on the non-zero transform coefficients through the application of a hybrid factorization and integer approximation technique.

15. A device configured to display a video image, comprising:
- a central processing unit (CPU);
- a random access memory (RAM);
- a display screen configured to present an image;
- decoder circuitry configured to transform a video bit stream into a transform domain representation that comprises a first group of blocks, each storing a plurality of coefficients of the transform domain representation, at least some of the plurality of coefficients being non-zero coefficients, the decoder circuitry capable of arranging non-zero transform coefficients of the transform domain representation in a hybrid data structure in a memory associated with the decoder circuitry, the decoder circuitry including circuitry for selectively applying a hybrid factorization/integer approximation technique during inverse motion compensation; and
- a bus in communication with the CPU, the RAM, the display screen and the decoder circuitry;
- wherein the hybrid data structure comprises a second group of blocks, each associated with a respective one of the blocks in the first group of blocks and each of which stores at least some non-zero coefficients from the corresponding block of the first group of blocks, and a variable size overflow vector that stores the remaining non-zero coefficients from the corresponding block.

16. The device of claim 15, wherein the device is a potable electronic device.

17. The device of claim 16, wherein the portable electronic device is selected from the group consisting of a personal digital assistant, a cellular phone, a web tablet and a pocket personal computer.

18. The device of claim 15, wherein each block of the second group of blocks is a fixed size block.

19. The device of claim 18, wherein each of the plurality of fixed size blocks are configured to hold 8 non-zero transform coefficients.

20. The device of claim 19, wherein non-zero transform coefficients in excess of 8 are stored in the variable size overflow vector.

21. The device of claim 15, wherein the decoder circuitry includes an on-chip memory configured to store data associated with the hybrid data structure.

22. The device of claim 15, wherein the circuitry for selectively applying a hybrid factorization/integer approximation technique during inverse motion compensation includes,
- circuitry for identifying blocks of a frame of the video image as being associated with one of an active motion area and an inactive motion area; and
- circuitry for performing inverse motion compensation by applying a factorization technique to the blocks associated with the active motion area and an integer approximation technique to the blocks associated with the inactive motion area.

23. The device of claim 15, wherein the video bit stream is a low rate video bit stream.

* * * * *